United States Patent
Yasui et al.

(10) Patent No.: US 7,997,070 B2
(45) Date of Patent: Aug. 16, 2011

(54) EXHAUST EMISSION CONTROL DEVICE FOR INTERNAL COMBUSTION ENGINE

(75) Inventors: Yuji Yasui, Saitama-ken (JP); Ikue Kawasumi, Saitama (JP)

(73) Assignee: Honda Motor Co. Ltd., Tokyo (JP)

( * ) Notice: Subject to any disclaimer, the term of this patent is extended or adjusted under 35 U.S.C. 154(b) by 679 days.

(21) Appl. No.: 12/134,670

(22) Filed: Jun. 6, 2008

(65) Prior Publication Data

US 2008/0306673 A1 Dec. 11, 2008

(30) Foreign Application Priority Data

Jun. 8, 2007 (JP) .................................. 2007-153278

(51) Int. Cl.
*F01N 3/00* (2006.01)
*F01N 3/10* (2006.01)

(52) U.S. Cl. ................. 60/295; 60/276; 60/286; 60/301

(58) Field of Classification Search .................... 60/286, 60/287, 299, 301, 303, 276, 295
See application file for complete search history.

(56) References Cited

U.S. PATENT DOCUMENTS

| 6,455,009 B1 * | 9/2002 | Kato et al. ................... 422/110 |
| 7,150,145 B2 * | 12/2006 | Patchett et al. ................. 60/286 |
| 2002/0152745 A1 * | 10/2002 | Patchett et al. ................. 60/286 |
| 2003/0051468 A1 * | 3/2003 | Van Nieuwstadt et al. ..... 60/286 |
| 2005/0282285 A1 | 12/2005 | Radhamohan et al. |

FOREIGN PATENT DOCUMENTS

| JP | 2004-100700 | 4/2004 |
| JP | 2004-251134 | 9/2004 |
| JP | 2006-105031 | 4/2006 |

OTHER PUBLICATIONS

European Office Action for Application No. 08009281.0, dated Sep. 22, 2008.

* cited by examiner

*Primary Examiner* — Thomas E Denion
*Assistant Examiner* — Patrick Maines
(74) *Attorney, Agent, or Firm* — Nelson Mullins Riley & Scarborough LLP; Anthony A. Laurentano

(57) ABSTRACT

An exhaust emission control device for an internal combustion engine, capable of supplying a just enough amount of reducing agent to a selective reduction catalyst even when a NOx purification ratio of the catalyst is changed by various causes, thereby enabling a high NOx purification ratio and very low exhaust emissions to be maintained. An ECU calculates a filtered value based on a signal from an exhaust gas concentration sensor, calculates a moving average value of a product of the filtered value and a reference input, calculates a control input such that the moving average value becomes equal to 0, and adds a reference input to the control input to calculate an FB injection amount. The ECU calculates an FF injection amount with a predetermined feedforward control algorithm, and adds the FF injection amount to the FB injection amount, to thereby calculate a urea injection amount.

12 Claims, 21 Drawing Sheets

NOx CONCENTRATION
ON DOWNSTREAM SIDE
OF CATALYST

AMMONIA CONCENTRATION
ON DOWNSTREAM SIDE
OF CATALYST

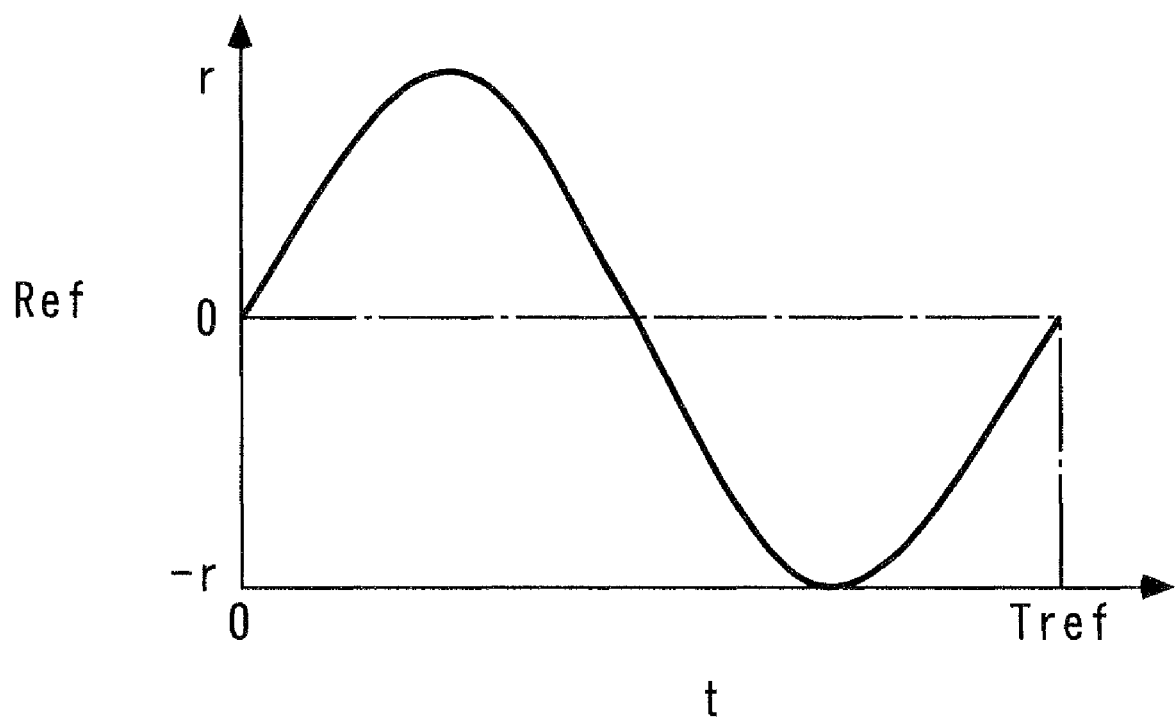
F I G. 5

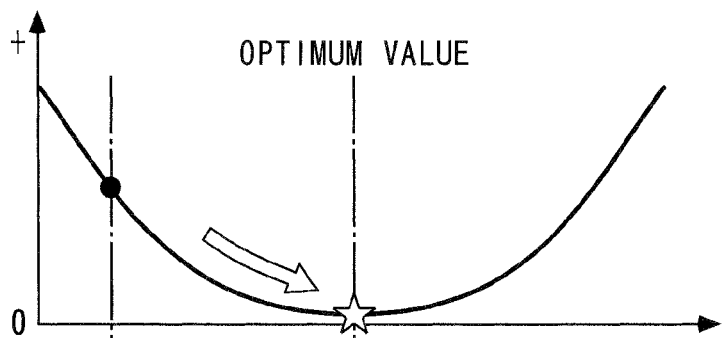
FIG. 6A  Vex
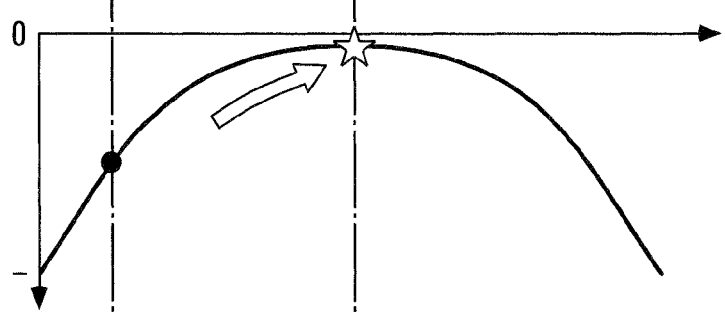
FIG. 6B  -Vex
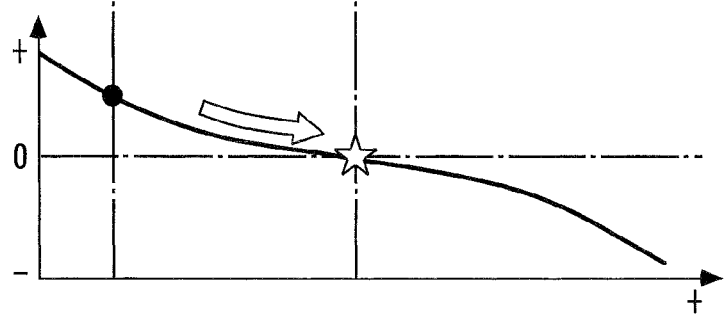
FIG. 6C  Cr
Gurea

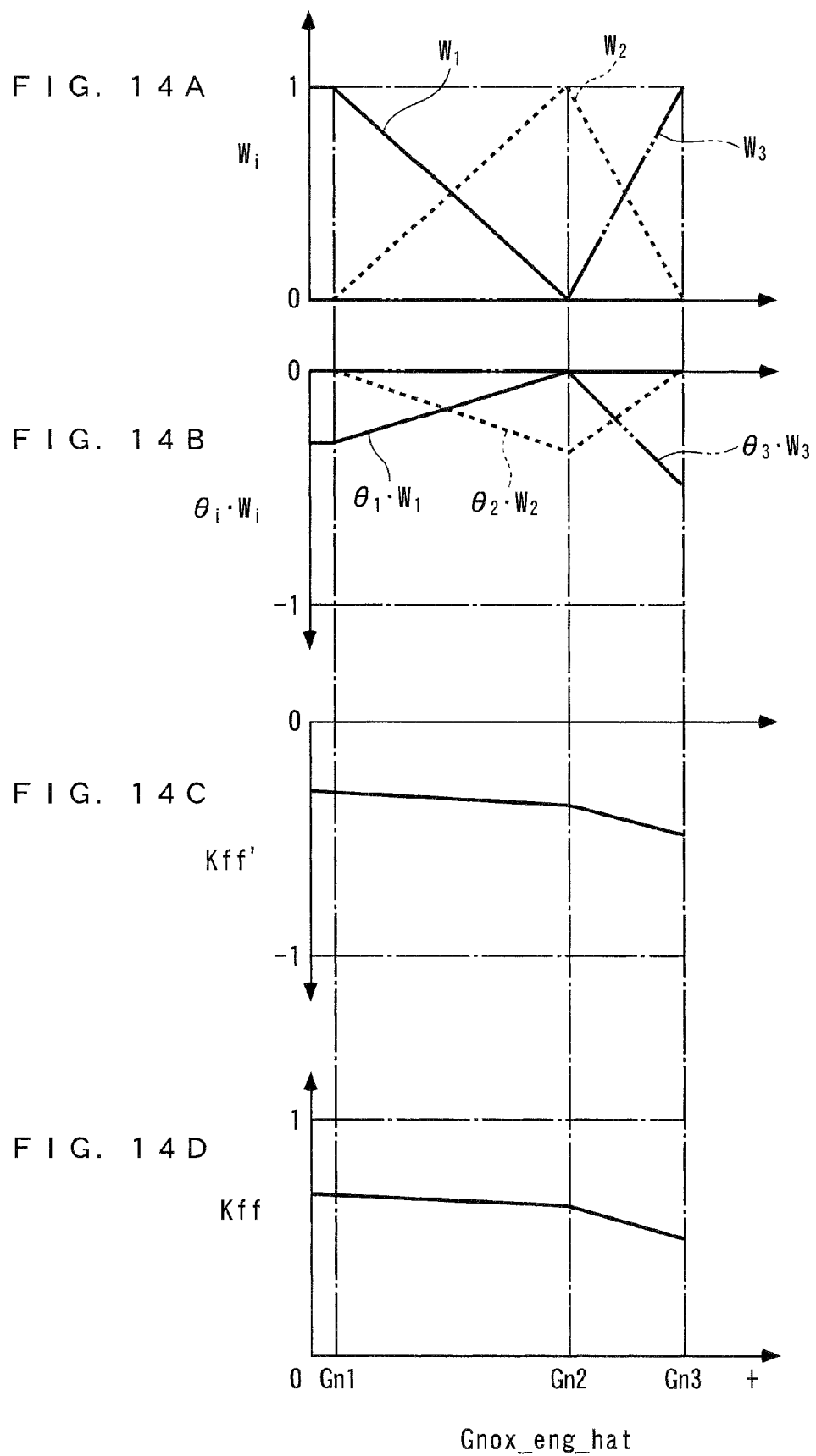

NOx CONCENTRATION ON DOWNSTREAM SIDE OF CATALYST

AMMONIA CONCENTRATION ON DOWNSTREAM SIDE OF CATALYST

Vnox

Vnh3

Vex

EXHAUST EMISSION CONTROL DEVICE FOR INTERNAL COMBUSTION ENGINE

BACKGROUND OF THE INVENTION

1. Field of the Invention

The present invention relates to an exhaust emission control device for an internal combustion engine, for purifying NOx in exhaust gases flowing through an exhaust passage, by a selective reduction catalyst in the presence of a reducing agent.

2. Description of the Related Art

Conventionally, as an exhaust emission control device of this kind, one disclosed in Japanese Laid-Open Patent Publication (Kokai) No. 2004-100700 is known. This internal combustion engine is a diesel engine having an exhaust passage, a reducing agent injection valve, an oxidation catalyst, and a selective reduction catalyst are arranged in the exhaust passage in this order from the upstream side to the downstream side. The reducing agent injection valve injects any of urea, ammonia, and diesel fuel as a reducing agent, whereby NOx in exhaust gases is selectively reduced by the selective reduction catalyst in the presence of a reducing agent. Further, the oxidation catalyst is disposed at a location upstream of the selective reduction catalyst so as to make the ratio x between the respective amounts of NO and $NO_2$ in exhaust gases flowing into the selective reduction catalyst equal to 1:1. Furthermore, the exhaust emission control device includes a controller for controlling the amount of reducing agent injected by the reducing agent injection valve, and a NOx concentration sensor for detecting the concentration of NOx on the downstream side of the selective reduction catalyst, and so forth.

In the above exhaust emission control device, the level of NOx (PPM) estimated to be emitted from the engine is calculated according to operating conditions of the engine, and the ratio x between the amount of NO and the amount of $NO_2$ in exhaust gases flowing from the oxidation catalyst into the selective reduction catalyst is calculated based on the level of NOx and the concentration of NOx detected by the NOx concentration sensor, using a predetermined arithmetic expression. Then, based on the ratio x and the level of NOx, the amount of reducing agent injected (more accurately, the amount of reducing agent to be injected) by the reducing agent injection valve is determined by an arithmetic expression derived from a reaction formula of reaction between the reducing agent, and NO and NOx (Paragraph numbers [0030] to [0033]). More specifically, in the exhaust emission control device, the composition of exhaust gases is estimated based on the value of the NOx concentration detected by the NOx concentration sensor and the operating conditions of the engine. Then, based on the estimated composition of exhaust gases, the NOx purification ratio (i.e. NOx reduction ratio) of the selective reduction catalyst is estimated, and the amount of injected reducing agent is feedforward-controlled based on the NOx purification ratio estimated as above.

In general, the NOx purification ratio of the selective reduction catalyst does not depend on the composition of exhaust gases alone but it varies with a change in the temperature of the selective reduction catalyst due to a change in the operating conditions of the engine 3, degradation of the selective reduction catalyst, and variation in NOx-purifying capability between individual selective reduction catalyst units. Further, some selective reduction catalysts have a characteristic of adsorbing ammonia, and when a selective reduction catalyst having such a characteristic is used, according to a change in the amount of ammonia adsorbed thereby, the amount of a reducing agent necessary for decreasing NOx changes, which causes the NOx purification ratio to appear to be changed.

In contrast, according to exhaust emission control device disclosed in Japanese Laid-Open Patent Publication (Kokai) No. 2004-100700, the NOx purification ratio is estimated based on the composition of exhaust gases, and the amount of injected reducing agent is simply feedforward-controlled based on the estimation, and hence no inconveniences are caused insofar as the NOx purification ratio of the selective reduction catalyst is determined simply by the composition of exhaust gases. However, when the NOx purification ratio is changed by various factors other than the composition of exhaust gases as described above, the estimation accuracy of the NOx purification ratio is lowered, which makes it impossible to properly control the amount of injected reducing agent. More specifically, it is impossible to properly control the amount of injected reducing agent e.g. when the temperature of the selective reduction catalyst changes with a change in the operating condition of the engine, when the selective reduction catalyst is degraded, when there is a large variation in the NOx-purifying capability between individual selective reduction catalyst units, or when the amount of ammonia adsorbed by a selective reduction catalyst having the ammonia adsorption characteristic changes. As a result, when the amount of the reducing agent injected to the selective reduction catalyst becomes short, the NOx purification ratio is degraded, whereas when the amount of injected reducing agent becomes too large, the amount of ammonia flowing from the selective reduction catalyst increases, which results in increased exhaust emissions.

SUMMARY OF THE INVENTION

It is an object of the present invention to provide an exhaust emission control device for an internal combustion engine, which is capable of supplying a just enough amount of reducing agent to a selective reduction catalyst even when the NOx purification ratio of the selective reduction catalyst is changed by various factors, thereby making it possible to maintain a high NOx purification ratio and very low exhaust emissions.

To attain the above object, in a first aspect of the present invention, there is provided an exhaust emission control device for an internal combustion engine, comprising a selective reduction catalyst disposed in an exhaust passage of the engine, for purifying NOx in exhaust gases flowing through the exhaust passage, in the presence of a reducing agent, a reducing agent supply device for supplying the reducing agent to the selective reduction catalyst, exhaust gas concentration-detecting means disposed in the exhaust passage at a location downstream of the selective reduction catalyst, for outputting a detection signal indicative of a concentration of NOx and a concentration of the reducing agent in the exhaust gases, the exhaust gas concentration-detecting means having a characteristic that a direction of a change in a value of the detection signal responsive to an increase/decrease of the concentration of NOx is the same as a direction of a change in the value of the detection signal responsive to an increase/decrease of the concentration of the reducing agent, variation value-calculating means for calculating a variation value an amplitude of which changes periodically at a predetermined repetition period, correlation parameter-calculating means for calculating a correlation parameter indicative of a correlation between the value of the detection signal and the variation value by using the value of the detection signal and the variation value, control input value-calculating means for calculating a value of a control input for controlling the value of the detection signal to an extremal value, based on the correlation parameter, and supply amount-determining means for determining an amount of supply of the reducing agent to the selective reduction catalyst by the reducing agent supply device such that the supply amount of the reducing agent includes the value of the control input and the variation value.

With the configuration of the control system according to the first aspect of the present invention, the exhaust gas concentration-detecting means outputs the detection signal indicative of the concentration of NOx and the detection signal indicative of the concentration of the reducing agent. In this case, the exhaust gas concentration-detecting means is disposed in the exhaust passage at a location downstream of the selective reduction catalyst, and therefore when too large an amount of reducing agent is supplied to the selective reduction catalyst, the amount of the reducing agent which is not consumed by the reduction of NOx increases, so that the concentration of the reducing agent in exhaust gases, on the downstream side of the selective reduction catalyst, increases, and accordingly the value of the detection signal from the exhaust gas concentration-detecting means changes its direction to indicate a direction toward the increase in the concentration of the reducing agent. On the other hand, when too small an amount of reducing agent is supplied to the selective reduction catalyst, the NOx reduction performance of the selective reduction catalyst is degraded, whereby the concentration of NOx in exhaust gases, on the downstream side of the selective reduction catalyst, increases, and accordingly the value of the detection signal from the exhaust gas concentration-detecting means changes its direction to indicate a direction toward the increase in the concentration of NOx. In addition, the exhaust gas concentration-detecting means has a characteristic that the direction of a change in the detection signal value responsive to the increase/decrease of the NOx concentration is the same as the direction of a change in the detection signal value responsive to the increase/decrease of the concentration of the reducing agent. For the above reason, the detection signal from the exhaust gas concentration-detecting means takes an extremal value (i.e. a local maximum value or a local minimum value) with respect to the amount of the reducing agent supplied to the selective reduction catalyst. Therefore, when the detection signal takes the extremal value, the supply amount of the reducing agent takes an optimum value which is capable of reducing both the concentration of reducing agent and that of NOx in exhaust gases on the downstream side of the selective reduction catalyst in a well-balanced manner. Further, this relationship is satisfied not only when the NOx purification ratio of the selective reduction catalyst is not changed but also when the NOx purification ratio is changed by various causes, as described above.

Further, in the exhaust emission control device, the correlation parameter indicative of the correlation between the detection signal value and the variation value is calculated using the value of the detection signal and the variation value, and based on the correlation parameter, the value of a control input for controlling the value of the detection signal to an extremal value is calculated, whereafter the amount of supply of the reducing agent to the selective reduction catalyst by the reducing agent supply device is determined such that the supply amount includes the values of the control input and the variation value. As described above, since the variation value is included in the supply amount of the reducing agent, the correlation parameter indicative of the correlation between the detection signal value and the variation value corresponds to a parameter indicative of the correlation between the supply amount of the reducing agent and the detection signal value. Further, as described above, since the detection signal takes an extremal value with respect to the amount of supply of reducing agent to the selective reduction catalyst, the value of the detection signal hardly changes with respect to a change in the supply amount of the reducing agent at the extremal value or in its vicinity, and the correlation therebetween decreases, whereas as the value of the detection signal is further away from the extremal value, the correlation between the value of the detection signal and the supply amount of the reducing agent increases. Since the correlation parameter represents the above-described correlation between the value of the detection signal and the supply amount of the reducing agent, if the control input value is calculated based on the correlation parameter, it is possible to calculate the control input value such that the detection signal can take the extremal value. Therefore, the supply amount of the reducing agent is determined such that it includes the control input value, and hence even when the NOx purification ratio of the selective reduction catalyst is changed by various causes, the supply amount of the reducing agent can be made optimum using the control input value such that the detection signal takes the extremal value, thereby making it possible to reduce both the concentration of reducing agent and that of NOx in exhaust gases on the downstream side of the selective reduction catalyst in a well-balanced manner. As a result, even when the NOx purification ratio of the selective reduction catalyst is changed by various causes, it is possible to maintain a high NOx purification ratio and very low exhaust emissions.

Preferably, the correlation parameter is calculated based on an integral value of a product of a value indicative of the value of the detection signal and the variation value, and the control input value-calculating means calculates the value of the control input with a predetermined feedback control algorithm such that the correlation parameter converges to 0.

With the configuration of the preferred embodiment, the correlation parameter is calculated based on the integral value that is obtained by integrating the product of the value indicative of the value of the detection signal and the variation value, so that the correlation parameter is calculated as a value corresponding to a correlation function between the value indicative of the value of the detection signal and the variation value, whereby the correlation parameter becomes closer to 0 as the correlation between the value indicative of the value of the detection signal and the variation value, i.e. the correlation between the value of the detection signal and the variation value is lower. Therefore, since the control input value is calculated with the predetermined feedback control algorithm such that the correlation parameter converges to 0, the supply amount of the reducing agent can be caused to converge to the optimum value by the control input value, whereby it is possible to hold the value of the detection signal of the detection signal from the exhaust gas concentration-detecting means at the extremal value This makes it possible to enhance the NOx purification ratio to reduce exhaust emissions.

More preferably, the integral value is calculated by integrating the product over a section of an integral multiple of the predetermined repetition period.

As described above, in the event that the correlation parameter is calculated based on the integral value that is obtained by integrating the product of the value indicative of the value of the detection signal and the variation value, and the control input value is calculated with the predetermined feedback control algorithm such that the correlation parameter converges to 0, and that the supply amount of the reducing agent is determined such that it includes the variation value and the control input value, if the relationship between the value of the detection signal and the supply amount of the reducing agent forms a closed loop, the frequency component of the variation value circulates through the closed loop to undergo resonance, which can make the control system unstable. In contrast, with the configuration of the preferred embodiment, since the integral value is calculated by integrating the product over the section of the integral multiple of the predetermined repetition period, it is possible to prevent the frequency of the variation value from being mixed with the integral value and the correlation parameter, thereby making it possible to prevent the frequency component of the variable value from circulating through the closed loop. As a result, the stability of the control system can be ensured.

More preferably, the predetermined feedback control algorithm is an algorithm to which is applied a predetermined response-specifying control algorithm.

With the configuration of the preferred embodiment, the control input value is calculated with the algorithm to which is applied the predetermined response-specifying control algorithm such that such that the correlation parameter converges to 0. Therefore, when the value of the detection signal has become close to the local minimum value or its vicinity, i.e. even when the supply amount of the reducing agent has become close to the optimum value or its vicinity, it is possible not only to cause the supply amount of the reducing agent to exponentially converge to the optimum value without causing an oscillating behavior or an unstable behavior but also to maintain the supply amount of the reducing agent at the optimum value or in its vicinity after conversion. This makes it possible to cause the value of the detection signal to exponentially converge to the extremal value but also to maintain the value of the detection signal at the extremal value or in its vicinity after conversion. Consequently, even when the NOx purification ratio of the selective reduction catalyst is changed by various causes, it is possible to further enhance the NOx purification ratio tp reduce exhaust emissions.

Preferably, the exhaust gas concentration-detecting means comprises NOx concentration-detecting means for outputting a signal indicative of the concentration of NOx in the exhaust gases, reducing agent concentration-detecting means for outputting a signal indicative of the concentration of the reducing agent in the exhaust gases, and detection signal value-calculating means for calculating the value of the detection signal by using a combination of a value of the detection signal indicative of the concentration of NOx and a value of the detection signal indicative of the concentration of the reducing agent.

With the configuration of the preferred embodiment, when the engine is provided with the NOx concentration-detecting means for outputting a signal indicative of the concentration of NOx in exhaust gases, and the reducing agent concentration-detecting means for outputting a signal indicative of the concentration of the reducing agent in exhaust gases, it is possible to obtain the same advantageous effects described above.

To attain the above object, in a second aspect of the present invention, there is provided an exhaust emission control device for an internal combustion engine, comprising a selective reduction catalyst disposed in an exhaust passage of the engine, for purifying NOx in exhaust gases flowing through the exhaust passage, in the presence of a reducing agent, exhaust gas concentration-detecting means disposed in the exhaust passage at a location downstream of the selective reduction catalyst, for outputting a detection signal indicative of concentrations of predetermined components including NOx in exhaust gases, a reducing agent supply device for supplying the reducing agent to the selective reduction catalyst, NOx purification ratio parameter-calculating means for calculating a NOx purification ratio parameter having a correlation with a NOx purification ratio of the selective reduction catalyst, NOx purification ratio-calculating means for calculating the NOx purification ratio, based on the NOx purification ratio parameter, by using a correlation model defining a correlation between the NOx purification ratio parameter and the NOx purification ratio of the selective reduction catalyst degraded to a predetermined degree of degradation, supply amount-determining means for determining an amount of supply of the reducing agent to the selective reduction catalyst by the reducing agent supply device, according to the NOx purification ratio, and supply amount-correcting means for calculating a supply amount correction value according to a value of the detection signal from the exhaust gas concentration-detecting means, and correcting the amount of supply of the reducing agent to the selective reduction catalyst, by using the supply amount correction value, wherein the NOx purification ratio-calculating means comprises model modification value-calculating means for calculating a model modification value with a predetermined algorithm such that an absolute value of the supply amount correction value is reduced, and purification ratio-calculating means for calculating the NOx purification ratio by using the correlation model modified by the model modification value.

With the configuration of the control system according to the second aspect of the present invention, the NOx purification ratio is calculated based on the NOx purification ratio parameter, using the correlation model that defines the relation between the NOx purification ratio parameter and the NOx purification ratio of the selective reduction catalyst in a state degraded to a predetermined degradation degree (e.g. in a new condition, and hence degradation degree=0), and according to the calculated NOx purification ratio, the amount of supply of the reducing agent to the selective reduction catalyst by the reducing agent supply device is determined. Further, the supply amount correction value is calculated based on the value of the detection signal from the exhaust gas concentration-detecting means, and the amount of the reducing agent is corrected using the supply amount correction value. As described above, when the supply amount of the reducing agent is controlled while being corrected using the supply amount correction value, since the supply amount correction value is calculated based on the value of the detection signal, there is a fear that response delay is caused before the results of correction of the supply amount of the reducing agent are reflected on the value of the detection signal. When such response delay is caused, the supply amount of the reducing agent becomes improper, which can result in the increased concentration of the reducing agent in exhaust gases on the downstream side of the selective reduction catalyst increases, or inversely in the increased NOx concentration.

In contrast, in the exhaust emission control device according to the second aspect of the present invention, the model modification value is calculated with the predetermined algorithm such that the absolute value of the supply amount correction value decreases, and the NOx purification ratio is calculated using the correlation model modified by the model modification value. Further, the supply amount of the reducing agent is determined according to the NOx purification ratio. Therefore, it is possible to properly supply the reducing agent to the selective reduction catalyst without causing response delay as described above. In addition, the model modification value is calculated such that the absolute value of the supply amount correction value decreases, and the NOx purification ratio is calculated using the correlation model modified by the model modification value thus calculated. Therefore, even when the NOx purification ratio of the selective reduction catalyst is changed by various causes, it is possible to properly calculate the NOx purification ratio while coping with the change in the NOx purification ratio. For the above reason, it is possible to maintain a high NOx purification ratio and very low exhaust emissions (It should be noted that throughout the specification, a state degraded to a predetermined degradation degree is intended to mean not only a degraded state but also a state where the catalyst is in a new and not degraded condition (degradation degree=0).

Preferably, the model modification value-calculating means calculates a plurality of products by multiplying a plurality of modification coefficients by values of a plurality of predetermined functions, respectively, and calculating the model modification value by using a total sum of the plurality of products. The plurality of predetermined functions are associated with a plurality of regions formed by dividing a region where the NOx purification ratio parameter is variable, respectively, and are set to values other than 0 in the associated regions while being set to 0 in regions other than the associated regions, and two adjacent ones of the regions overlap each other and are configured such that an absolute value of a total sum of values of the functions associated with the overlapping regions is equal to an absolute value of a maximum value of each function. Each of the plurality of modification coefficients is calculated such that the absolute value of the supply amount correction value decreases in one of the regions associated with one of the functions by which the each modification coefficient is multiplied.

With the configuration of the preferred embodiment, the plurality of products are calculated by multiplying a plurality of modification coefficients by a plurality of predetermined functions, respectively, for calculating the model modification value by using the total sum of the plurality of products. Therefore, when the actual relationship between the NOx purification ratio parameter and the NOx purification ratio suffers from a local error or a change due to aging in any of the above-described three regions, or even when there is variation in the above actual relationship, the correlation model can be caused to properly match the actual relationship between the NOx purification ratio parameter and the NOx purification ratio. As a result, even when a modeling error of the correlation model is caused due to degradation of the selective reduction catalyst or variation in NOx-purifying capability between individual selective reduction catalysts, it is possible to properly compensate for the modeling error.

In addition, the plurality of predetermined functions are associated with a plurality of regions formed by dividing a region where the NOx purification ratio parameter is variable, respectively, and set to values other than 0 in the associated regions while being set to 0 in regions other than the associated regions, such that two adjacent regions of the regions overlap each other, and the absolute value of the total sum of values of the functions associated with the overlapping regions becomes equal to the absolute value of the maximum value of each function. Therefore, in modifying the correlation model, it is possible to modify the same continuously over the plurality of regions of the NOx purification ratio parameter, so that the modified correlation model has no discontinuities. This makes it possible to prevent the calculated value of the NOx purification ratio from becoming temporarily improper due to the discontinuities of the correlation model. Furthermore, each of the plurality of modification coefficients is calculated such that the absolute value of the supply amount correction value decreases in one of the regions, associated with one of the functions by which the each modification coefficient is multiplied. Therefore, even when the NOx purification ratio is changed in a transient state, it is possible to properly supply the reducing agent to the selective reduction catalysts without causing response delay as described above. For the above reason, it is possible to still further improve the calculation accuracy of the supply amount of the reducing agent.

Preferably, the exhaust gas concentration-detecting means outputs a detection signal indicative of a concentration of NOx and a concentration of the reducing agent in exhaust gases, as the detection signal indicative of the concentrations of the components, and has a characteristic that a direction of a change in a value of the detection signal responsive to an increase/decrease of the NOx concentration is the same as a direction of a change in the value of the detection signal responsive to an increase/decrease of the concentration of the reducing agent, and the supply amount-correcting means comprises variation value-calculating means for calculating a variation value an amplitude of which changes periodically at a predetermined repetition period, correlation parameter-calculating means for calculating a correlation parameter indicative of a correlation between the value of the detection signal and the variation value by using the value of the detection signal and the variation value, and control input value-calculating means for calculating the supply amount correction value as a control input value for controlling the value of the detection signal to an extremal value, based on the correlation parameter, wherein the amount of supply of the reducing agent to the selective reduction catalyst is corrected by a sum of the value of the control input and the variation value.

With the configuration of the preferred embodiment, the detection signal indicative of the concentration of NOx and the concentration of the reducing agent is output from the exhaust gas concentration-detecting means. The detection signal has a characteristic that the direction of a change in the value of the detection signal responsive to the increase/decrease of the NOx concentration is the same as the direction of a change in the value of the detection signal responsive to the increase/decrease of the concentration of the reducing agent. Accordingly, for the aforementioned reason, the value of the detection signals take extremal value s with respect to the amount of the reducing agent to be supplied to the selective reduction catalyst. Further, as described above, when the detection signals take the extremal values, the supply amount of the reducing agent takes the optimum value which is capable of reducing both the concentration of reducing agent and that of NOx in exhaust gases on the downstream side of the selective reduction catalyst in a well-balanced manner. Further, this relationship is satisfied not only when the NOx purification ratio of the selective reduction catalyst is not changed but even when the NOx purification ratio is changed by various causes, as described above.

Further, the correlation parameter indicative of the correlation between the value of the detection signals and the variation value is calculated using the value of the detection signal and the variation value, and based on the calculated correlation parameter, the supply amount correction value is calculated as the control input value for controlling the value of the detection signal to extremal value, based on the correlation parameter. Further, the supply amount of the reducing agent is corrected by the sum of the control input value and the variation value. As described above, the variation value is included in the supply amount of the reducing agent, so that as described hereinbefore, the correlation parameter comes to represent the correlation between the value of the detection signals and the supply amount of the reducing agent, and by calculating the control input value based on the correlation parameter, the control input value can be calculated such that the detection signal value can take the extremal value. Further, since the supply amount of the reducing agent is corrected by the sum of the control input value and the variation value, even when the NOx purification ratio is changed by various causes, the supply amount of the reducing agent can be controlled to the optimum value. This makes it possible to control the value of the detection signal to the extremal value, thereby making it possible to reduce both the concentration of the reducing agent and that of NOx in exhaust gases on the downstream side of the selective reduction catalyst in a well-balanced manner. As a result, even when the NOx purification ratio of the selective reduction catalyst is changed by various causes, it is possible to maintain the NOx purification ratio to decrease exhaust emissions at respective high levels.

Preferably, the correlation parameter-calculating means calculates the correlation parameter by integrating a product of a value indicative of the value of the detection signal and the variation value, over a section of an integral multiple of the predetermined repetition period.

As described heretofore, in the case where the correlation parameter is calculated using the value of the detection signals and the variation value, and based on the correlation parameter, the supply amount correction value is calculated as the control input value, to correct the supply amount of the reducing agent by the sum of the control input value and the variation value, if the relationship between the value of the detection signals and the supply amount of the reducing agent forms a closed loop, the frequency component of the variation value circulates through the closed loop to undergo resonance, which can make the control system unstable. In contrast, with the configuration of the preferred embodiment, since the correlation parameter is calculated by integrating the product of the value indicative of the value of the detection signal and the variation value, over the section of the integral multiple of the predetermined repetition period, it is possible to prevent the frequency of the variation value from being mixed with the correlation parameter, thereby making it possible to prevent the frequency component of the variation value from circulating through the closed loop. As a result, it is possible to ensure the stability of the control system.

More preferably, the model modification value-calculating means calculates the model modification value by using a value obtained by integrating one of the sum of the value of the control input and the variation value, and the value of the control input, over a section of an integral multiple of the predetermined repetition period.

As described heretofore, when the correlation parameter is calculated using the value of the detection signal and the variation value; the supply amount correction value is calculated based on the correlation parameter; the model modification value is calculated such that the absolute value of the supply amount correction value decreases; the NOx purification ratio is calculated using the correlation model modified by the model modification value; and the amount of supply of the reducing agent to the selective reduction catalyst by the reducing agent supply device is determined based on the NOx purification ratio, if the relationship between the value of the detection signal and the supply amount of the reducing agent forms a closed loop, the frequency component of the variation value circulates through the closed loop to undergo resonance, which can make the control system unstable. In contrast, with the configuration of the preferred embodiment, the model modification value is calculated using a value obtained by integrating one of the sum of the control input value and the variation value, and the control input value, over a section of an integral multiple of the predetermined repetition period. This makes it possible to prevent the frequency of the variation value from being mixed with the model modification value, thereby making it possible to the frequency component of the variation value from circulating through the closed loop. As a result, it is possible to ensure the stability of the control system both in a steady state and a transient state.

Preferably, the exhaust emission control device further comprises degradation-determining means for determining that the selective reduction catalyst has been degraded when an absolute value of the model modification value has exceeded a predetermined value, and warning means for outputting warning information indicative of the degradation of the selective reduction catalyst when it is determined by the degradation-determining means that the selective reduction catalyst has been degraded.

With the configuration of the preferred embodiment, when the absolute value of the model modification value has exceeded the predetermined value, it is determined that the selective reduction catalyst has been degraded, and when it is determined that the selective reduction catalyst has been degraded, warning information indicative of the degradation of the selective reduction catalyst is delivered. Therefore, it is possible to properly notify the user of the engine of the degradation of the selective reduction catalyst. This makes it possible to prevent operation of the engine from being continued in spite of degradation of the selective reduction catalyst, thereby making it possible to avoid an increase in exhaust emissions.

Preferably, the exhaust emission control device further comprises degradation-determining means for determining that the selective reduction catalyst has been degraded when an absolute value of the model modification value has exceeded a predetermined value, and inhibiting means for inhibiting supply of the reducing agent to the selective reduction catalyst by the reducing agent supply device when it is determined by the degradation-determining means that the selective reduction catalyst has been degraded.

With the configuration of the preferred embodiment, when the absolute value of the model modification value has exceeded the predetermined value, it is determined that the selective reduction catalyst has been degraded, and when it is determined that the selective reduction catalyst has been degraded, the reducing agent is inhibited from being supplied to the selective reduction catalyst by the reducing agent supply device. This makes it possible to prevent an excess amount of the reducing agent from being supplied to the selective reduction catalyst in spite of degradation of the selective reduction catalyst, which makes it possible to prevent the reducing agent from flowing out downstream of the urea selective reduction catalyst, thereby making it possible to avoid an increase in exhaust emissions.

The above and other objects, features, and advantages of the present invention will become more apparent from the following detailed description taken in conjunction with the accompanying drawings.

BRIEF DESCRIPTION OF THE DRAWINGS

FIG. 5 is a block diagram of a reference input Ref;

FIGS. 6A to 6C are diagrams which are useful in explaining a control algorithm of the optimum value search controller;

FIG. 14A is a diagram showing an example of a result of calculation of nonlinear weight functions $W_i$;

FIG. 14B is a diagram showing an example of a result of calculation of products $\theta_i \cdot W_i$;

FIG. 14C is a diagram showing an example of a result of calculation of a sum Kff';

FIG. 14D is a diagram showing an example of a result of calculation of a model modification coefficient Kff;

DETAILED DESCRIPTION OF PREFERRED EMBODIMENTS

Figure 1:
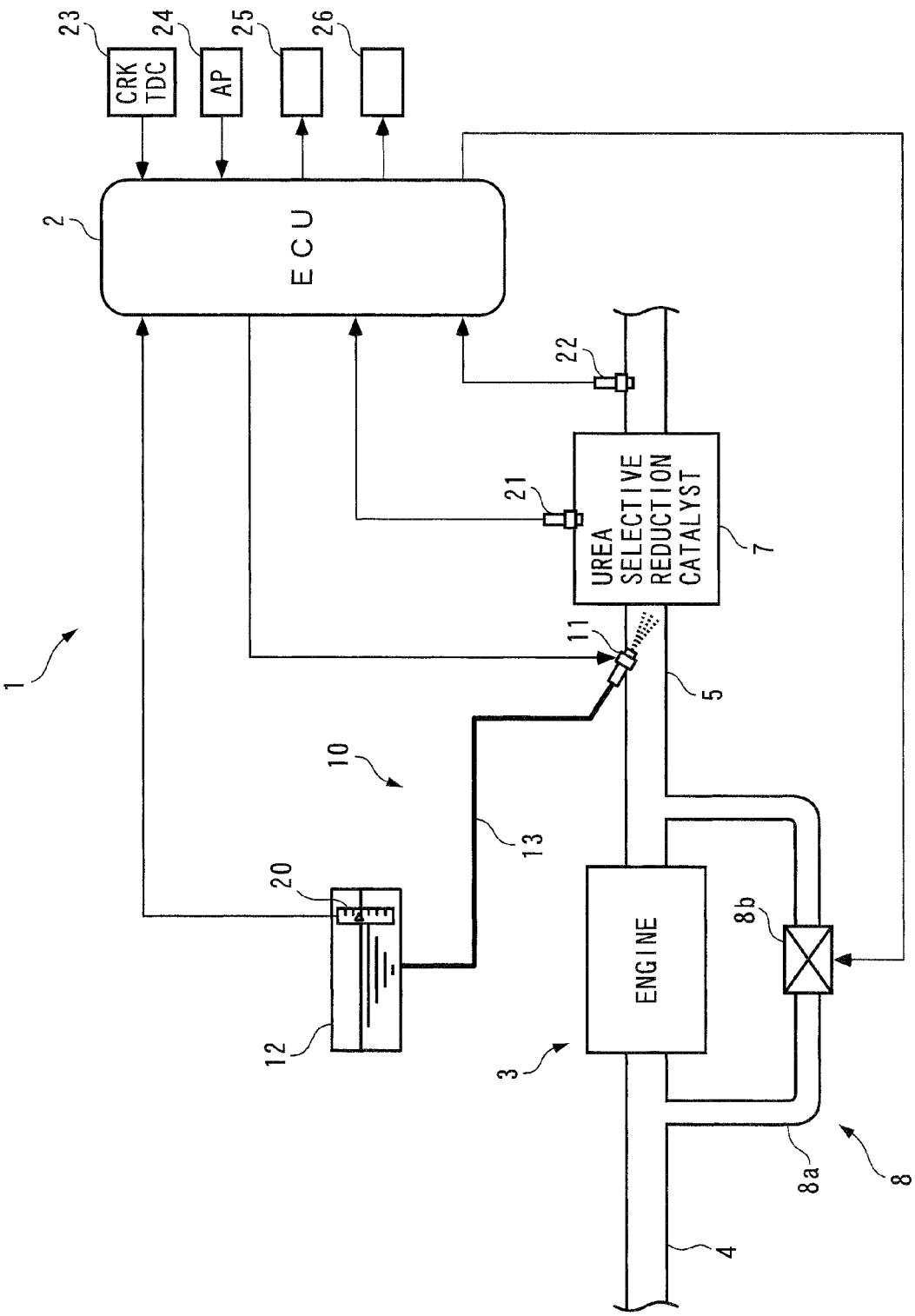
FIG. 1 is a schematic diagram of an exhaust emission control device according to an embodiment of the present invention, and an internal combustion engine to which is applied the exhaust emission control device.

Hereafter, an exhaust emission control device for an internal combustion engine, according to an embodiment of the present invention will be described with reference to the drawings. FIG. 1 schematically shows the arrangement of the exhaust emission control device 1 according to the present embodiment, and the internal combustion engine (hereinafter referred to as "the engine") 3 to which is applied the exhaust emission control device. The engine 3 is (a gasoline engine or a diesel engine) of a lean-burn operation type, and is installed on a vehicle, not shown.

As shown in FIG. 1, the exhaust emission control device 1 is comprised of an ECU 2, a urea selective reduction catalyst 7 disposed in an exhaust passage 5 of the engine 3, a urea injection device 10 for injecting urea water into the exhaust passage 5 on the upstream side of the urea selective reduction catalyst 7, and so forth.

The urea injection device 10 (reducing agent supply device) includes a urea injection valve 11, and a urea tank 12. The urea tank 12 stores urea water, and is connected to the urea injection valve 11 via a urea supply passage 13 and a urea pump (not shown).

The urea injection valve 11 is electrically connected to the ECU 2. When the urea injection valve 11 is driven by a control signal from the ECU2, to open, the urea injection valve 11 injects urea water supplied from the urea tank 12 into the exhaust passage 5. In short, urea injection control is carried out. In this case, part of urea of the urea water injected from the urea injection valve 11 is changed into ammonia by heat of exhaust gases and contact with the urea selective reduction catalyst 7.

Further, the urea tank 12 has a urea level sensor 20 mounted thereto. The urea level sensor 20 detects the level of urea water in the urea tank 12, and delivers a signal indicative of the detected level of urea water to the ECU 2. The ECU 2 calculates the amount Qurea of urea water remaining in the urea tank 12 (hereinafter also referred to as "the urea remaining amount Qurea") based on the signal from the urea level sensor 20.

On the other hand, the urea selective reduction catalyst 7 selectively reduces nitrogen oxide (NOx) in exhaust gases under an atmosphere in which urea exists as a reducing agent. In the urea selective reduction catalyst 7, ammonia that is changed from urea during injection of urea water is also consumed together with the urea by a NOx reducing action of the catalyst 7.

A catalyst temperature sensor 21 is mounted to the urea selective reduction catalyst 7. The catalyst temperature sensor 21 detects the temperature Tscr of the urea selective reduction catalyst 7 (hereinafter referred to as "the catalyst temperature Tscr"), and delivers a signal indicative of the detected catalyst temperature Tscr to the ECU 2. The ECU 2 calculates the catalyst temperature Tscr based on the signal from the catalyst temperature sensor 21.

Further, an exhaust gas concentration sensor 22 is provided in the exhaust passage 5 at a location downstream of the urea selective reduction catalyst 7. The exhaust gas concentration sensor 22 (exhaust gas concentration-detecting means) is electrically connected to the ECU 2, and has characteristics that it is responsive to both NOx and ammonia in exhaust gases, and the value Vex of a detection signal therefrom indicative of a detected NOx/ammonia concentration in exhaust gases (hereinafter referred to as "the detection signal value Vex") becomes larger as the concentration of NOx or that of ammonia is higher.

It should be noted that although in FIG. 1, for ease of understanding, only the urea selective reduction catalyst 7 is shown in the exhaust passage 5 with no other exhaust devices shown therein, an oxidation catalyst, not shown, is provided in the exhaust passage 5 at a location downstream of the exhaust gas concentration sensor 22, for oxidation of ammonia having passed through the urea selective reduction catalyst 7.

Further, the engine 3 includes an exhaust gas recirculation mechanism 8. The exhaust gas recirculation mechanism 8 recirculates part of exhaust gases flowing through the exhaust passage 5 into an intake passage 4, and is comprised of an EGR passage 8a connected between the intake passage 4 and the exhaust passage 5, and an EGR control valve 8b for opening and closing the EGR passage 8a.

The EGR control valve 8b is implemented by a linear solenoid valve a valve lift of which is linearly changed between a maximum value and a minimum value thereof, and is electrically connected to the ECU 2. The ECU 2 changes the opening of the EGR passage 8a via the EGR control valve 8b to thereby control the amount of exhaust recirculation, i.e. the EGR amount.

Although not shown, an EGR lift sensor and a differential pressure sensor are connected to the ECU 2. The EGR lift sensor detects the valve lift of the EGR control valve 8b, and delivers a signal indicative of the detected valve lift to the ECU 2. The differential pressure sensor detects the differential pressure between pressures on the upstream side and downstream side of the EGR control valve 8b, and delivers a signal indicative of the detected differential pressure to the ECU 2. The ECU 2 calculates an EGR ratio Regr based on the signals from the EGR lift sensor and the differential pressure sensor.

Further, connected to the ECU 2 are a crank angle sensor 23, an accelerator pedal opening sensor 24, a catalyst degradation warning lamp 25, and a urea remaining amount warning lamp 26, respectively. The crank angle sensor 23 is comprised of a magnet rotor and an MRE (magnetic resistance element) pickup, and delivers a CRK signal and a TDC signal, which are both pulse signals, to the ECU 2 in accordance with rotation of a crankshaft (not shown).

The CRK signal is delivered whenever the crankshaft rotates through a predetermined angle (e.g. 1°). The ECU 2 calculates the rotational speed NE of the engine 3 (hereinafter referred to as "the engine speed NE") based on the CRK signal. The TDC signal indicates that each piston (not shown) in an associated one of cylinders (not shown) is in a predetermined crank angle position slightly before the TDC position at the start of the intake stroke, and is delivered whenever the crankshaft rotates through a predetermined crank angle.

Further, the accelerator pedal opening sensor 24 detects a stepped-on amount AP of an accelerator pedal, not shown, of the vehicle (hereinafter referred to as "the accelerator pedal opening AP") and delivers a signal indicative of the detected accelerator pedal opening AP to the ECU 2.

Furthermore, both the catalyst degradation warning lamp 25 and the urea remaining amount warning lamp 26 are arranged on a meter panel of the vehicle. When the urea selective reduction catalyst 7 is degraded, to indicate the fact, the catalyst degradation warning lamp 25 is turned on. Further, when the amount of urea water remaining in the urea tank 12 (urea remaining amount Qurea) becomes small, to indicate the fact, the urea remaining amount warning lamp 26 is turned on.

On the other hand, the ECU 2 is implemented by a microcomputer comprised of a CPU, a RAM, a ROM, an I/O interface, and a drive circuit (none of which are shown). The ECU 2 determines an operating condition of the engine 3 in response to the signals from the aforementioned sensors 20 to 24, and carries out various control processes, such as a urea injection control process, described hereinafter.

It should be noted that in the present embodiment, the ECU 2 corresponds to exhaust gas concentration-detecting means, variation value-calculating means, correlation parameter-calculating means, control input value-calculating means, supply amount-determining means, detection signal value-calculating means, NOx purification ratio parameter-calculating means, NOx purification ratio-calculating means, supply amount-correcting means, model modification value-calculating means, purification ratio-calculating means, degradation-determining means, warning means, and inhibition means.

Figure 2:
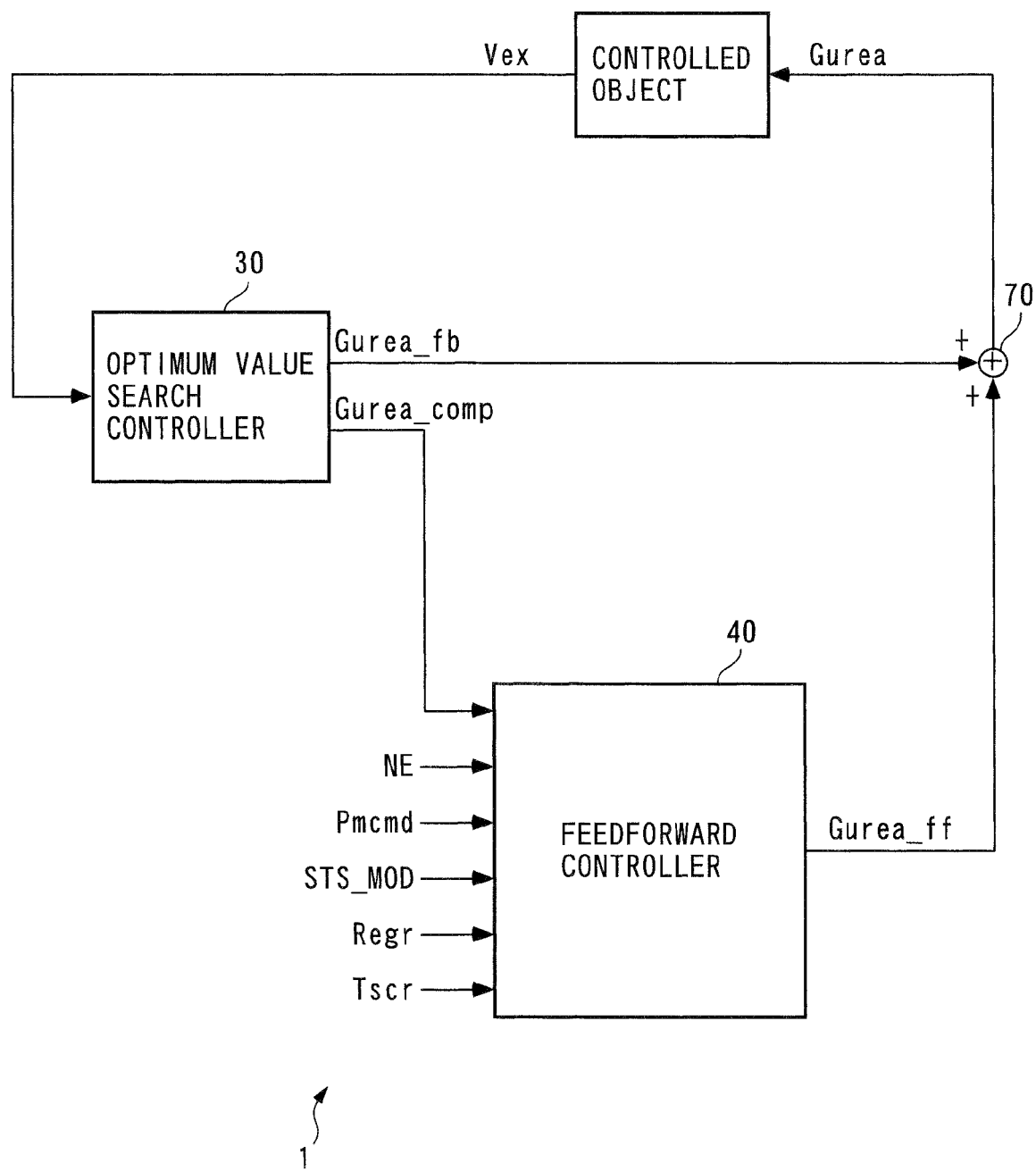
FIG. 2 is a schematic functional block diagram of the exhaust emission control device.

Next, the configuration of the exhaust emission control device 1 according to the present embodiment will be described with reference to FIG. 2. As shown in FIG. 2, the exhaust emission control device 1 is comprised of an optimum value search controller 30, a feedforward controller 40, and an adder 70. The controllers 30 and 40 and the adder 70 are implemented by the ECU 2.

The optimum value search controller 30 calculates the amount Gurea_fb of feedback injection (hereinafter referred to as "the FB injection amount Gurea_fb"), and a correction component Gurea_comp by a method, described hereinafter. The FB injection amount Gurea_fb is calculated as a value for feedback control of a controlled object to which is input a urea injection amount Gurea, and from which is output the detection signal value Vex. It should be noted that in the present embodiment, the optimum value search controller 30 corresponds to the supply amount-correcting means, and the FB injection amount Gurea_fb corresponds to the sum of the value of a control input and a variation value.

Further, the feedforward controller (hereinafter referred to as "the FF controller") 40 calculates the amount Gurea_ff of feedforward injection (hereinafter referred to as "the FF injection amount Gurea_ff") by a method, described hereinafter. The FF injection amount Gurea_ff is calculated as a value for feedforward control of the above-described controlled object. It should be noted that in the present embodiment, the FF controller 40 corresponds to the supply amount-determining means, and the FF injection amount Gurea_ff corresponds to the amount of supplied reducing agent.

The adder 70 calculates the urea injection amount Gurea (amount of supplied reducing agent) by adding the FF injection amount Gurea_ff and the FB injection amount Gurea_fb using the following equation:

$$Gurea(k) = Gurea\_ff(k) + Gurea\_fb(k) \quad (1)$$

It should be noted that in the above equation (1), data with a symbol (k) indicates that it is discrete data calculated or sampled at a predetermined control period ΔT (e.g. 5 msec). The symbol k indicates a control time point at which respective discrete data is calculated. For example, the symbol k indicates that discrete data therewith is a value calculated in the current control timing, and a symbol k−1 indicates that discrete data therewith is a value calculated in the immediately preceding control timing. Further, in the following description, the symbol (k) provided for the discrete data is omitted as deemed appropriate.

Figure 3A:
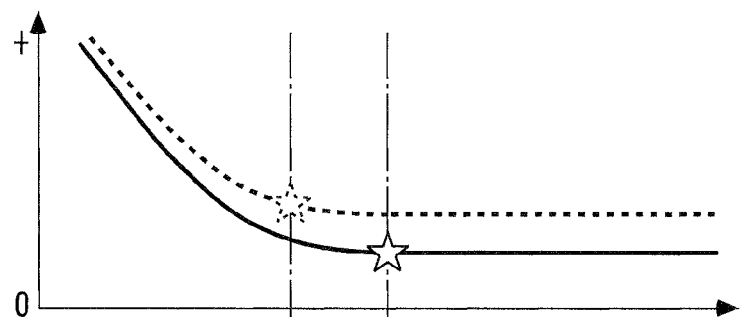
FIGS. 3A to 3C are diagrams showing characteristics of a detection signal value Vex of a signal from an exhaust gas concentration sensor.
Figure 3B:
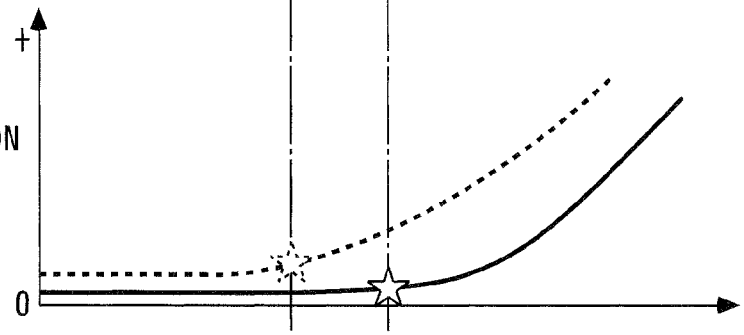
Figure 3C:
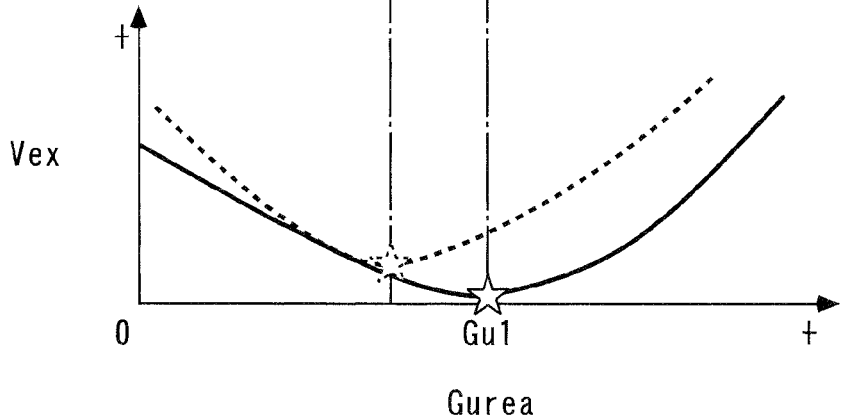

Next, a description will be given of the optimum value search controller 30. As will be described hereinafter, the optimum value search controller 30 calculates the FB injection amount Gurea_fb and the correction component Gurea_comp. The FB injection amount Gurea_fb is for feedback-controlling the urea injection amount Gurea such that the detection signal value Vex of the signal from the exhaust gas concentration sensor 22 takes a local minimum value (optimum value). The reason for thus calculating the FB injection amount Gurea_fb is as follows:

In the case of the present embodiment, the relationship between the urea injection amount Gurea, which is the amount of urea water injected by the urea injection valve 11, and the detection signal value Vex is as shown in FIGS. 3A to 3C since the exhaust gas concentration sensor 22 is provided on the downstream side of the urea selective reduction catalyst 7, and has the above-described characteristics.

FIGS. 3A and 3B show an example of measurement results of the concentration of NOx and an example of measurement results of ammonia in exhaust gases on the downstream side of the urea selective reduction catalyst 7, which are obtained by changing the urea injection amount Gurea. FIG. 3C shows an example of measurement results of the detection signal value Vex of the signal from the exhaust gas concentration sensor 22, which are obtained by changing the urea injection amount Gurea. Further, in FIG. 3C, a curve indicated by a solid line shows the measurement results obtained by using the urea selective reduction catalyst 7 which is in a new condition and hence is not degraded, while a curve indicated by a broken line shows the measurement results obtained by using the urea selective reduction catalyst 7 which is degraded.

As is apparent from FIG. 3C, when the urea selective reduction catalyst 7 is not degraded, the detection signal value Vex takes the local minimum value when the urea injection amount Gurea takes a predetermined value Gu1, and becomes larger as the urea injection amount Gurea is larger or smaller than the predetermined value Gu1. This is due to the following principle: In a region of Gurea>GU1, since the urea injection amount Gurea is too large, the amount of urea which is not consumed by the reduction of NOx increases as the urea injection amount Gurea is larger than the predetermined value Gu1, and at the same time the superfluous amount of ammonia which is not consumed by the reduction of NOx, out of ammonia changed from urea, also increases to thereby increase the concentration of ammonia in exhaust gases on the downstream side of the urea selective reduction catalyst 7. Consequently, in the range of Gurea>GU1, as the urea injection amount Gurea is larger, the detection signal value Vex becomes larger in accordance with the increase in the concentration of ammonia. More specifically, as the amount of urea which is not consumed by the reduction of NOx increases, the detection signal value Vex becomes larger to indicate the fact, and at the same time indicates the concentration of urea in exhaust gases on the downstream side of the urea selective reduction catalyst 7.

On the other hand, in a region of Gurea<GU1, since the urea injection amount Gurea is too small, the NOx reduction performance of the urea selective reduction catalyst 7 is lowered, whereby the concentration of NOx in exhaust gases on the downstream side of the urea selective reduction catalyst 7 increases. As a result, in the region of Gurea<GU1, as the urea injection amount Gurea is smaller, the detection signal value Vex becomes larger in accordance with increase in the concentration of NOx. As described above, it is understood that when the detection signal value Vex takes the local minimum value, the urea injection amount Gurea takes an optimum value which is capable of reducing both the concentration of ammonia and that of NOx in exhaust gases on the downstream side of the urea selective reduction catalyst 7 in a well-balanced manner. Further, as is apparent from the measurement results indicated by the broken line in FIG. 3C, the above relationship between the concentration of ammonia and that of NOx is satisfied even when the urea selective reduction catalyst 7 is degraded.

As is clear from the above-described principle, even when the NOx purification ratio of the urea selective reduction catalyst 7 is changed by various factors other than the degradation of the urea selective reduction catalyst 7, if the urea injection amount Gurea is controlled such that the detection signal value Vex takes the local minimum value, it is possible to reduce both the concentration of ammonia and that of NOx in exhaust gases on the downstream side of the urea selective reduction catalyst 7 in a well-balanced manner. Therefore, the optimum value search controller 30 calculates the FB injection amount Gurea_fb with a control algorithm, described hereinafter, such that the detection signal value Vex of the signal from the exhaust gas concentration sensor 22 converges to the local minimum value.

Figure 4:
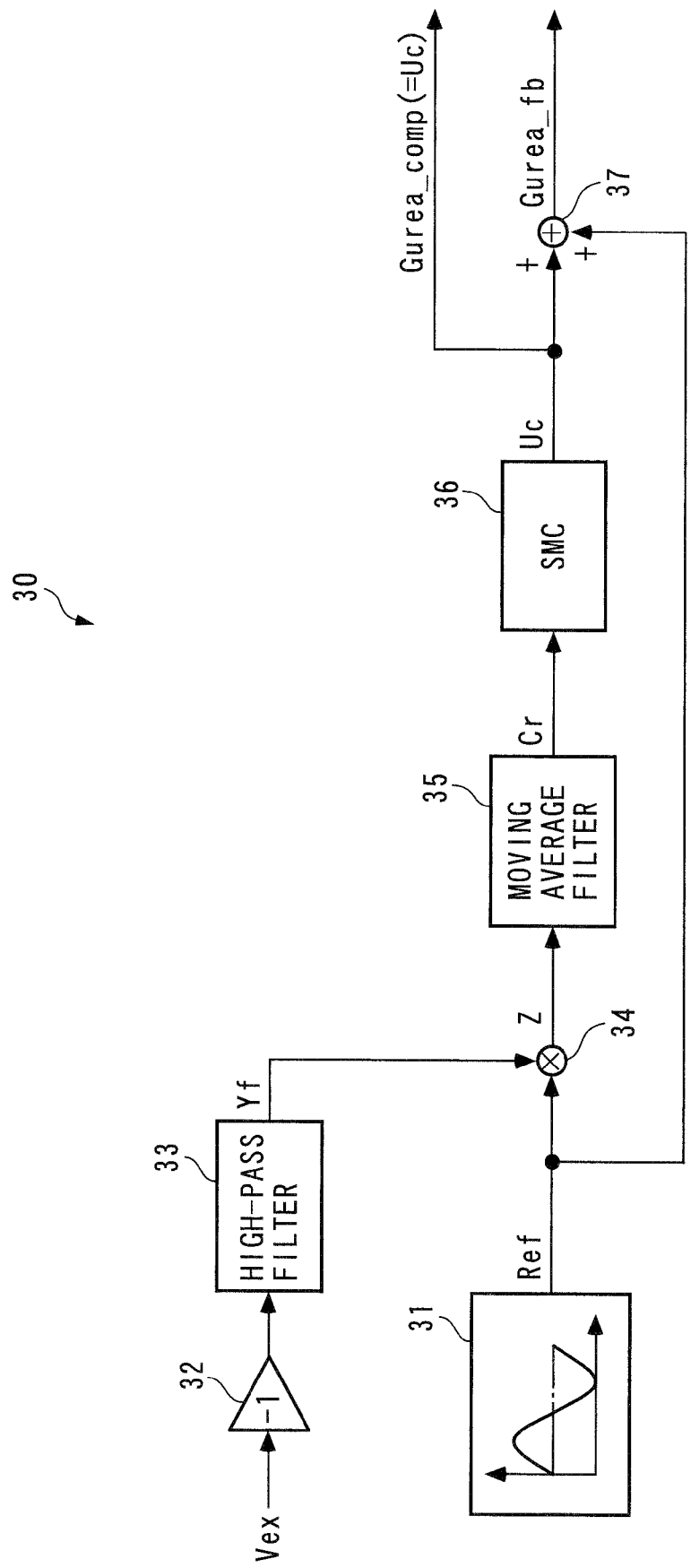
FIG. 4 is a schematic functional block diagram of an optimum value search controller.

Next, the optimum value search controller 30 will be described with reference to FIG. 4. As shown in FIG. 4, the optimum value search controller 30 is comprised of a reference input-calculating section 31, an inverting amplifier 32, a high-pass filter 33, a multiplier 34, a moving average filter 35, a sliding mode controller (represented by "SMC" in FIG. 4) 36, and an adder 70.

First, the reference input-calculating section 31 calculates a reference input Ref by the following equation (2). It should be noted that in the present embodiment, the reference input-calculating section 31 corresponds to the variation value-calculating means, and the reference input Ref corresponds to a variation value.

$$Ref(k) = r \cdot \sin\left(\frac{2\pi}{Tref} \cdot (n-1) \cdot \Delta T\right) \quad (2)$$

In the above equation, r represents the amplitude of the reference input Ref, Tref represents a predetermined repetition period of the reference input Ref, and n represents the number of times of control operations. The predetermined repetition period Tref is set such that Tref=2m·ΔT (m is a positive integer) holds, and the frequency (1/Tref) of the reference input Ref becomes lower than a cutoff frequency for a controlled object having low-pass characteristics, to which is input the urea injection amount Gurea, and from which is output the detection signal value Vex. As is clear from the equation (2), the reference input Ref is calculated as a value that changes sinusoidally, as shown in FIG. 5.

It should be noted that the method of calculating the reference input Ref is not limited to the above-described method, but the reference input Ref may be calculated by a method in which the horizontal axis appearing in FIG. 5 is used to represent a counter value which is incremented or decremented whenever the control period ΔT elapses, and a table is searched according to the counter value to calculate the reference input Ref.

On the other hand, the inverting amplifier 32 calculates an inverted value Vinv by inverting the sign of the detection signal value Vex, as shown in the following equation (3):

$$Vinv(k) = -Vex(k) \quad (3)$$

The inverted value Vinv obtained by inverting the sign of the detection signal value Vex as described above is calculated for the following reason: The algorithm used by the optimum value search controller 30 is for searching for a local maximum value. However, the detection signal value Vex according to the present embodiment takes a local minimum value with respect to the urea injection amount Gurea, as shown in FIGS. 3C and 6A, and therefore the detection signal value Vex cannot be used as it is. To solve the problem, as shown in FIG. 6B, if the sign of the detection signal value Vex is inverted, the obtained value takes a local maximum value with respect to the urea injection amount Gurea, and hence in the present embodiment, the inverted value Vinv having such a characteristic is used.

Therefore, the exhaust gas concentration sensor 22 may be replaced by an exhaust gas concentration sensor a detection signal value from which varies with respect to the urea injection amount Gurea, similarly to the inverted value Vinv, that is, an exhaust gas concentration sensor a detection signal value from which takes the local maximum value with respect to the urea injection amount Gurea. In this case, it is possible to omit the inverting amplifier 32.

Next, the high-pass filter 33 calculates a filtered value Yf (value indicative of the detection signal value) by high path filter calculation represented by the following equation (4):

$$Yf(k)=0.5 \cdot Vinv(k)-0.5-Vinv(k-1) \tag{4}$$

The above high-pass filter 33 is for eliminating constant components and very low frequency components contained in the detection signal value Vex, and effectively extract a frequency component caused by the reference input Ref. The cutoff frequency of the high-pass filter 33 is set to a value capable of realizing the above-described functions.

It should be noted that the method of calculating the filtered value Yf is not limited to the above-described method, but any suitable method may be used insofar as it is capable of calculating the filtered value Yf by performing a predetermined filtering process on the detection signal value Vex, thereby effectively extracting the frequency component caused by the reference input Ref from the detection signal value Vex. For example, the high-pass filter 33 may be replaced by a bandpass filter such that a bandpass filtering process is performed on the detection signal value Vex, to thereby effectively extract the frequency component caused by the reference input Ref from the detection signal value Vex. In this case, it is only required to set the passband of the band pass filter to a frequency region containing the frequency component caused by the reference input Ref.

On the other hand, the multiplier 34 calculates a product Z by the following equation (5):

$$Z(k)=Yf(k)*Ref(k-d) \tag{5}$$

In the above equation (5), d represents a dead time of the exhaust emission control device 1, i.e. a dead time it takes for exhaust gases containing urea injected from the urea injection valve 11 to reach the exhaust gas concentration sensor 22 after being reduced by the urea selective reduction catalyst 7. In the present embodiment, the dead time is set to a predetermined value in advance. The reference input Ref(k−d) the dead time d earlier is used as described above so as to multiply the current value Yf(k) of the filtered value by the reference input Ref(k−d) the dead time d earlier, which is a cause of the current value Yf(k). If the dead time d varies with the engine speed NE, load on the engine, the operation mode of the engine 3, or the like, the dead time d may be calculated by a method of searching a map according to these parameters.

Next, the moving average filter 35 calculates a moving average value Cr of the product Z by the moving average method expressed by the following equation (6). It should be noted that in the present embodiment, the moving average filter 35 corresponds to the correlation parameter-calculating means, and the moving average value Cr corresponds to a correlation parameter.

$$Cr(k) = \frac{1}{Nref} \cdot \sum_{i=0}^{Nref-1} Z(k-i) \tag{6}$$

In the above equation (6), Nref represents an integer value which is set such that Nref·ΔT=m·Tref (m is a positive integer) holds. In this case, the value Nref·ΔT corresponds to a moving average section. More specifically, the moving average value Cr is calculated as a value obtained by calculating moving average of the product Z over sections as an integral multiple of predetermined repetition period Tref of the reference input Ref. This is to avoid generation of resonance caused by circulation of the frequency component of the reference input Ref in a closed loop formed by the relationship between the detection signal value Vex and the FB injection amount Gurea_fb in the optimum value search controller 30, as shown in FIG. 2.

Further, the sliding mode controller 36 (control input value-calculating means) calculates a control input value Uc with a sliding mode control algorithm expressed by the following equations (7) to (10).

$$\sigma ex(k) = Cr(k) + Sex \cdot Cr(k-1) \tag{7}$$

$$Uc\_rch(k) = Krch\_ex \cdot \sigma ex(k) \tag{8}$$

$$Uc\_adp(k) = Kadp\_ex \cdot \sum_{i=0}^{k} \sigma ex(i) \tag{9}$$

$$Uc(k) = Uc\_rch(k) + Uc\_adp(k) \tag{10}$$

In the above equation (7), σex represents a switching function, and Sex represents a switching function-setting parameter which is set such that −1<Sex<0 holds. Further, in the above equation (8), Uc_rch represents a reaching law input, and Krch_ex represents a predetermined reaching law gain. Furthermore, in the above equation (9), Uadp_ex represents an adaptive law input, and Kadp_ex represents a predetermined adaptive law gain. Further, as shown in the above equation (10), the control input value Uc is calculated as the sum of the reaching law input Urch_ex and the adaptive law input Uadp_ex.

Further, the adder 37 calculates the FB injection amount Gurea_fb by the following equation (11). It should be noted that the equation (11) may be configured such that the reference input Ref on the right side is multiplied by a predetermined gain.

$$Gurea\_fb(k)=Uc(k)+Ref(k) \tag{11}$$

On the other hand, as shown in the following equation (12), the correction component Gurea_comp is set to a value equal to the control input value Uc.

$$Gurea\_comp(k)=Uc(k) \tag{12}$$

As described above, the optimum value search controller 30 calculates the moving average value Cr by the moving average calculation of the product Z of the reference input Ref and the filtered value Yf over the moving average section Nref·ΔT, so that the moving average value Cr corresponds to a finite section correlation function between the reference input Ref and the filtered value Yf, whereby the absolute value of the moving average value Cr becomes larger as the correlation between the reference input Ref and the filtered value Yf is higher, i.e. as the correlation between the reference input Ref and the detection signal value Vex is higher, whereas as the correlation therebetween is lower, the absolute value of the moving average value Cr becomes closer to 0.

As is clear from the aforementioned equations (1) and (11), since the urea injection amount Gurea is calculated such that the reference input Ref is included therein, the above-described moving average value Cr represents the correlation between the urea injection amount Gurea and the detection signal value Vex. Further, as shown in FIG. 6A, since the detection signal value Vex takes the local minimum value with respect to the urea injection amount Gurea, the correlation between the detection signal value Vex and the urea injection amount Gurea becomes lower as the detection signal value Vex becomes closer to the local minimum value. More specifically, as shown in FIG. 6C, as the absolute value of the moving average value Cr becomes closer to 0, the detection signal value Vex becomes closer to the local minimum value, and the absolute value of the moving average value Cr monotonously increases or decreases as the urea injection amount Gurea increases or decreases. Therefore, if the urea injection amount Gurea is feedback-controlled such that the absolute value of the moving average value Cr is monotonously reduced to 0, it is possible to control the detection signal value Vex to the local minimum value.

For the above reason, the optimum value search controller 30 calculates the control input value Uc with the aforementioned sliding mode control algorithm such that the moving average value Cr converges to 0, and then the adder 70 calculates the FB injection amount Gurea_fb by adding the reference input Ref to the control input value Uc. Therefore, by using the FB injection amount Gurea_fb, it is possible to feedback-control the urea injection amount Gurea such that the detection signal value Vex converges to the local minimum value. Furthermore, since the sliding mode control algorithm is used as a feedback control algorithm, differently from a case where a PID control algorithm or the like is used, it is possible not only to cause the detection signal value Vex to exponentially converge to the local minimum value without causing an oscillating behavior or an unstable behavior even when the detection signal value Vex has become close to the local minimum value but also to maintain the detection signal value Vex at the local minimum value or in its vicinity after conversion.

It should be noted that in the optimum value search controller 30, the control algorithm for calculating the control input value Uc is not limited to the aforementioned sliding mode control algorithm but any suitable algorithm may be used insofar as it is an algorithm to which is applied a predetermined response-specifying control algorithm. For example, the control input value Uc may be calculated with a back-stepping control algorithm. In this case as well, similarly to the case where the sliding mode control algorithm according to the present embodiment is used, the above-described advantageous effects can be obtained.

Further, under a condition where the oscillating behavior or unstable behavior of the detection signal value Vex is allowed when the detection signal value Vex has become close to the local minimum value or its vicinity, a feedback control algorithm, such as the PID control algorithm or an optimum control algorithm, may be used as a control algorithm for calculating the control input value Uc.

Furthermore, to cause the detection signal value Vex of the signal from the exhaust gas concentration sensor 22 to converge to the local minimum value without causing a steady-state deviation, it is necessary that an integration element (the adaptive law input Uadp_ex) is contained in the control algorithm as in the optimum value search controller 30, but under a condition where some degree of the steady-state deviation is allowed, the adaptive law input Uadp may be calculated by the following equation (13) in place of the aforementioned equation (9).

$$Uc\_adp(k)=\lambda a \cdot Uc\_adp(k-1)+Kadp\_ex \cdot \sigma ex(k) \quad (13)$$

In the above equation (13), $\lambda a$ represents a forgetting coefficient which is set to a value (e.g. 0.99) such that $0<<\lambda a<1$ holds. Now, when the adaptive law input Uadp_ex is calculated by the aforementioned equation (9), under a condition where the detection signal value Vex of the signal from the exhaust gas concentration sensor 22 cannot be caused to converge to the local minimum value by a certain cause, there is a fear that the adaptive law input Uadp_ex increases to make the control input value Uc too large. In this case, it takes time for the control input value Uc to return to an appropriate value when the above-described cause is eliminated. In contrast, if the adaptive law input Uadp_ex is calculated by the aforementioned equation (13), it is possible to avoid an increase in the adaptive law input Uadp_ex to thereby prevent the control input value Uc from taking too large a value. This makes it possible to quickly obtain an appropriate control input value Uc when the above-described cause is eliminated.

Figure 7:
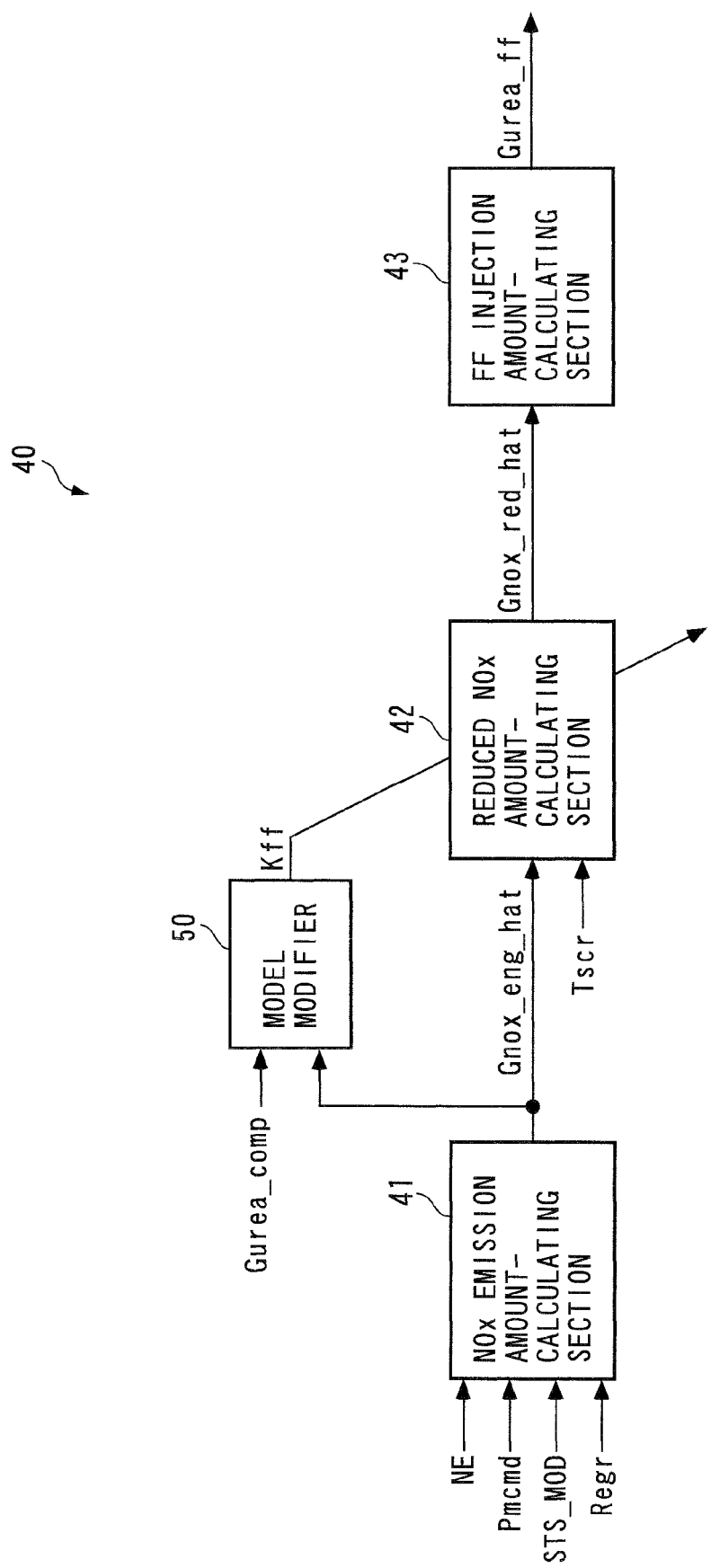
FIG. 7 is a schematic functional block diagram of a feedforward controller.

Next, the above-described FF controller 40 will be described with reference to FIG. 7. The FF controller 40 is for calculating an FF injection amount Gurea_ff for feedforward-controlling the urea injection amount Gurea, and as shown in FIG. 7, it includes an NOx emission amount-calculating section 41, a reduced NOx amount-calculating section 42, an FF injection amount-calculating section 43, and a model modifier 50.

First, a description will be given of the NOx emission amount-calculating section 41. The NOx emission amount-calculating section 41 is for calculating the amount of NOx estimated to be emitted, i.e. exhausted from the engine 3, as an NOx emission amount Gnox_eng_hat by a method, described hereinafter. It should be noted that in the present embodiment, the NOx emission amount-calculating section 41 corresponds to the NOx purification ratio parameter-calculating means.

First, a map for use in calculating a map value Gnox_eng_bs of the NOx emission amount is selected from a plurality of maps according to an operation mode value STS_MOD. The operation mode value STS_MOD represents the operation mode of the engine 3, and is set according to various operating parameters (the engine speed NE, the accelerator pedal opening AP, the vehicle speed, etc.).

Figure 8:
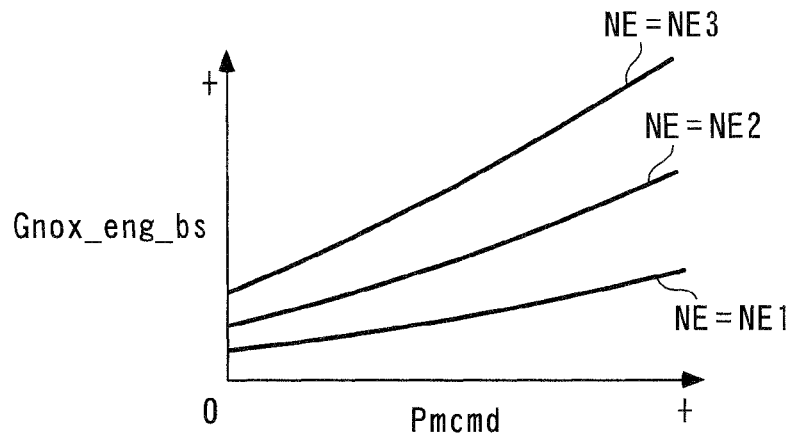
FIG. 8 is a diagram showing an example of a map for use in calculating a map value Gnox_eng_bs of an NOx emission amount.

In this case, when the operation mode value STS_MOD indicates the normal operation mode of the engine 3, a map appearing in FIG. 8 is selected. In FIG. 8, NE1 to NE3 represent predetermined values of the engine speed NE, which are set such that NE1<NE2<NE3 holds. In this map, as a demanded torque Pmcmd is larger or the engine speed NE is higher, the map value Gnox_eng_bs is set to a larger value. This is because as the load on the engine 3 is higher, the combustion temperature of a mixture becomes higher to increase the NOx emission amount, and as the engine speed NE is higher, the amount of NOx emitted, i.e. exhausted per unit time increases.

Next, the demanded torque Pmcmd is calculated by searching a map, not shown, according to the engine speed NE and the accelerator pedal opening AP. After that, the map value Gnox_eng_bs of the NOx emission amount is calculated by searching the above-described selected map according to the engine speed NE and the demanded torque Pmcmd.

Figure 9:
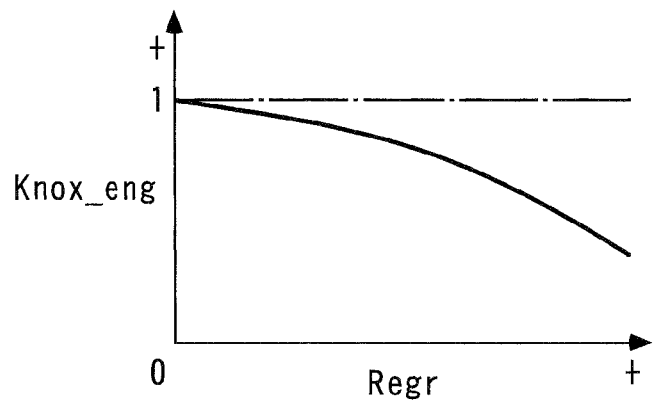
FIG. 9 is a diagram showing an example of a table for use in calculating an EGR-dependent correction coefficient Knox_eng.

Further, an EGR-dependent correction coefficient Knox_eng is calculated by searching a table shown in FIG. 9 according to the EGR ratio Regr. In this table, the EGR-dependent correction coefficient Knox_eng is set to 1 when Regr=0 holds, and as the EGR ratio Regr is larger, it is set to a smaller value. This is because when the EGR ratio Regr is large, the combustion temperature of the mixture becomes lower to reduce the NOx emission amount.

The NOx emission amount-calculating section 41 finally calculates the NOx emission amount Gnox_eng_hat by the following equation (14):

$$Gnox\_eng\_hat(k) = Knox\_eng(k) \cdot Gnox\_eng\_bs(k) \quad (14)$$

Next, a description will be given of the reduced NOx amount-calculating section 42. The reduced NOx amount-calculating section 42 is for calculating the amount of NOx estimated to be reduced by the urea selective reduction catalyst 7, as a reduced NOx amount Gnox_red_hat by a method, described hereinafter. It should be noted that in the present embodiment, the reduced NOx amount-calculating section 42 corresponds to the NOx purification ratio-calculating means and the purification ratio-calculating means.

Figure 10:
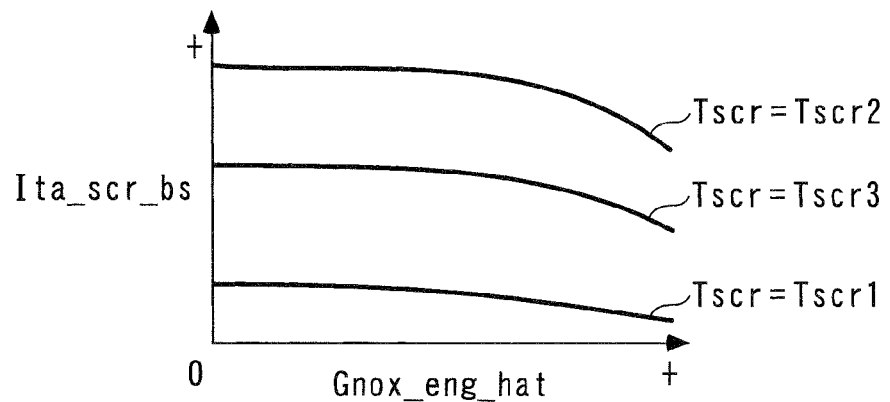
FIG. 10 is a diagram showing an example of a table for use in calculating a map value Ita_scr_bs of an estimated NOx purification ratio.

First, a map value Ita_scr_bs of an estimated NOx purification ratio is calculated by searching a map shown in FIG. 10 according to the above-mentioned NOx emission amount Gnox_eng_hat and catalyst temperature Tscr. In FIG. 10, Tscr1 to Tscr3 represent predetermined values of the catalyst temperature Tscr, which are set such that Tscr1<Tscr2<Tscr3 holds. In this map, the map value Ita_scr_bs is set such that it becomes smaller, as the NOx emission amount Gnox_eng_hat is larger. This is because as the NOx emission amount Gnox_eng_hat is larger, the probability of NOx being brought into contact with the urea selective reduction catalyst 7 becomes lower.

Further, in the above map, the map value Ita_scr_bs becomes largest when the catalyst temperature Tscr is equal to the predetermined value Tscr2, and is set to a smaller value when the catalyst temperature Tscr is lower or higher than the predetermined value Tscr2 (Tscr=Tscr1, or Tscr=Tscr3). This is because the urea selective reduction catalyst 7 has a characteristic that the NOx purification ratio thereof becomes highest when the catalyst temperature Tscr is in a predetermined temperature range (e.g. 300 to 500° C.). It should be noted that the FIG. 10 map is set based on average characteristics of the urea selective reduction catalyst 7 in a new condition, and corresponds to a correlation model in the present embodiment.

Subsequently, an estimated NOx purification ratio Ita_scr_hat is calculated by the following equation (15):

$$Ita\_scr\_hat(k) = Kf\!f(k-1) \cdot Ita\_scr\_bs(k) \quad (15)$$

In the above equation (15), Kff represents a model modification coefficient, which is calculated as a positive value by a model modifier 50, as described hereinafter. As shown in the equation (15), the estimated NOx purification ratio Ita_scr_hat is calculated by modifying the map value Ita_scr_bs with the model modification coefficient Kff.

It should be noted that in the present embodiment, the NOx emission amount Gnox_eng_hat and the catalyst temperature Tscr correspond to a NOx purification ratio parameter, the map value Ita_scr_bs corresponds to the NOx purification ratio assumed when the selecting reduction catalyst is in a condition degraded to a predetermined degree, and the estimated NOx purification ratio Ita_scr_hat corresponds to the NOx purification ratio.

The reduced NOx amount-calculating section 42 finally calculates the reduced NOx amount Gnox_red_hat by the following equation (16):

$$Gnox\_red\_hat(k) = \frac{Ita\_scr\_hat(k)}{100} \cdot Gnox\_eng\_hat(k) \quad (16)$$

On the other hand, the FF injection amount-calculating section 43 calculates the FF injection amount Gurea_ff based on the reduced NOx amount Gnox_red_hat calculated as described above by the following equation (17):

$$Gurea\_f\!f(k) = Knox\_urea\_Gnox\_red\_hat(k) \quad (17)$$

In the above equation (17), Knox_urea represents a conversion coefficient for converting the reduced NOx amount Gnox_red_hat to the urea injection amount, and is set to a predetermined value in advance according to a ratio between urea and water in urea water.

Next, a description will be given of the model modifier 50. The model modifier 50 is for calculating the model modification coefficient Kff. As shown in the aforementioned equation (15), the model modification coefficient Kff is for modifying (or correcting) the map value Ita_scr_bs, i.e. for modifying the FIG. 10 map, as a correlation model, which is set based on the average characteristics of the new urea selective reduction catalyst 7. It should be noted that in the present embodiment, the model modifier 50 corresponds to the model modification value-calculating means, and the model modification coefficient Kff corresponds to a model modification value.

Figure 11A:
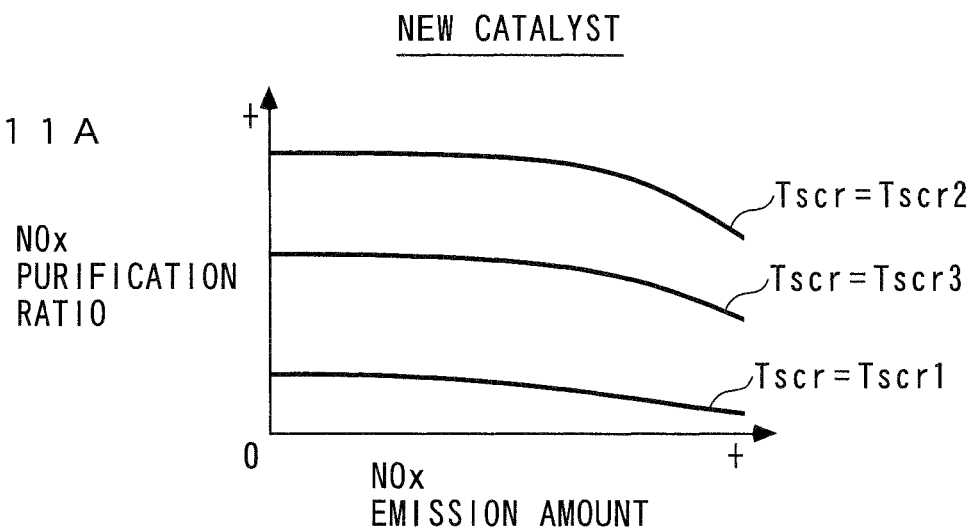
FIG. 11A is a diagram showing a NOx purification ratio of a urea selective reduction catalyst in a new condition.
Figure 11B:
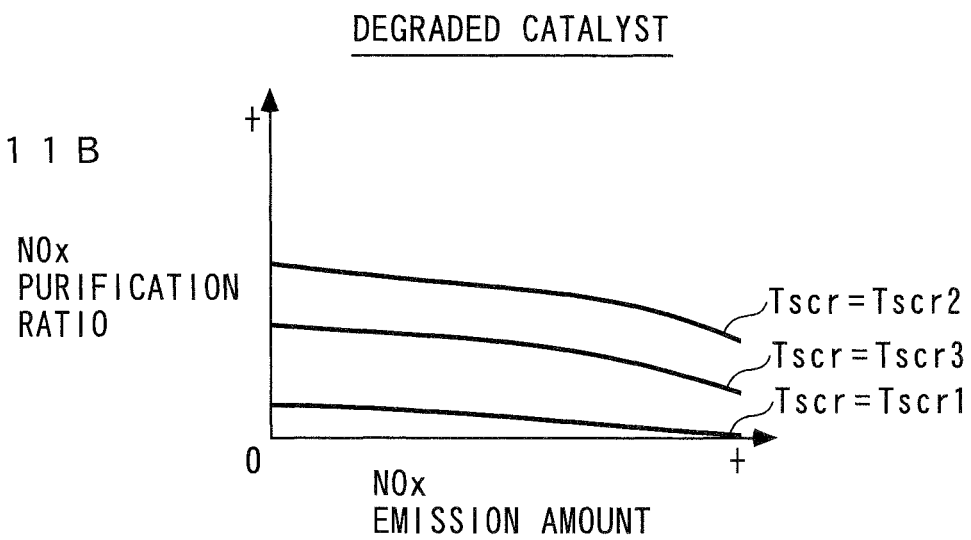
FIG. 11B is a diagram showing a NOx purification ratio of the urea selective reduction catalyst in a degraded condition.

Next, the reason for using the above-mentioned model modification coefficient Kff will be described with reference to FIGS. 11A and 11B. FIG. 11A shows the relationship between the NOx emission amount, the catalyst temperature Tscr and the NOx purification ratio, obtained by using the urea selective reduction catalyst 7 when the urea selective reduction catalyst 7 is in a new and undegraded condition. FIG. 11B shows the relationship therebetween obtained by using the urea selective reduction catalyst 7 when the urea selective reduction catalyst 7 is in a degraded condition. As is clear from FIGS. 11A and 11B, when the urea selective reduction catalyst 7 is in a degraded condition, the NOx purification ratio is not uniformly lowered in the whole region of the NOx emission amount, but it changes with variation in the degree of decrease in the NOx purification ratio. Therefore, to modify the map value Ita_scr_bs, it is necessary to nonlinearly modify the map value in a manner corresponding to the change in the NOx purification ratio. Therefore, in the model modifier 50, to nonlinearly modify the map value Ita_scr_bs, which is a NOx purification ratio assumed when the urea selective reduction catalyst 7 is undegraded, the model modification coefficient Kff is calculated by a method, described hereinafter.

Figure 12:
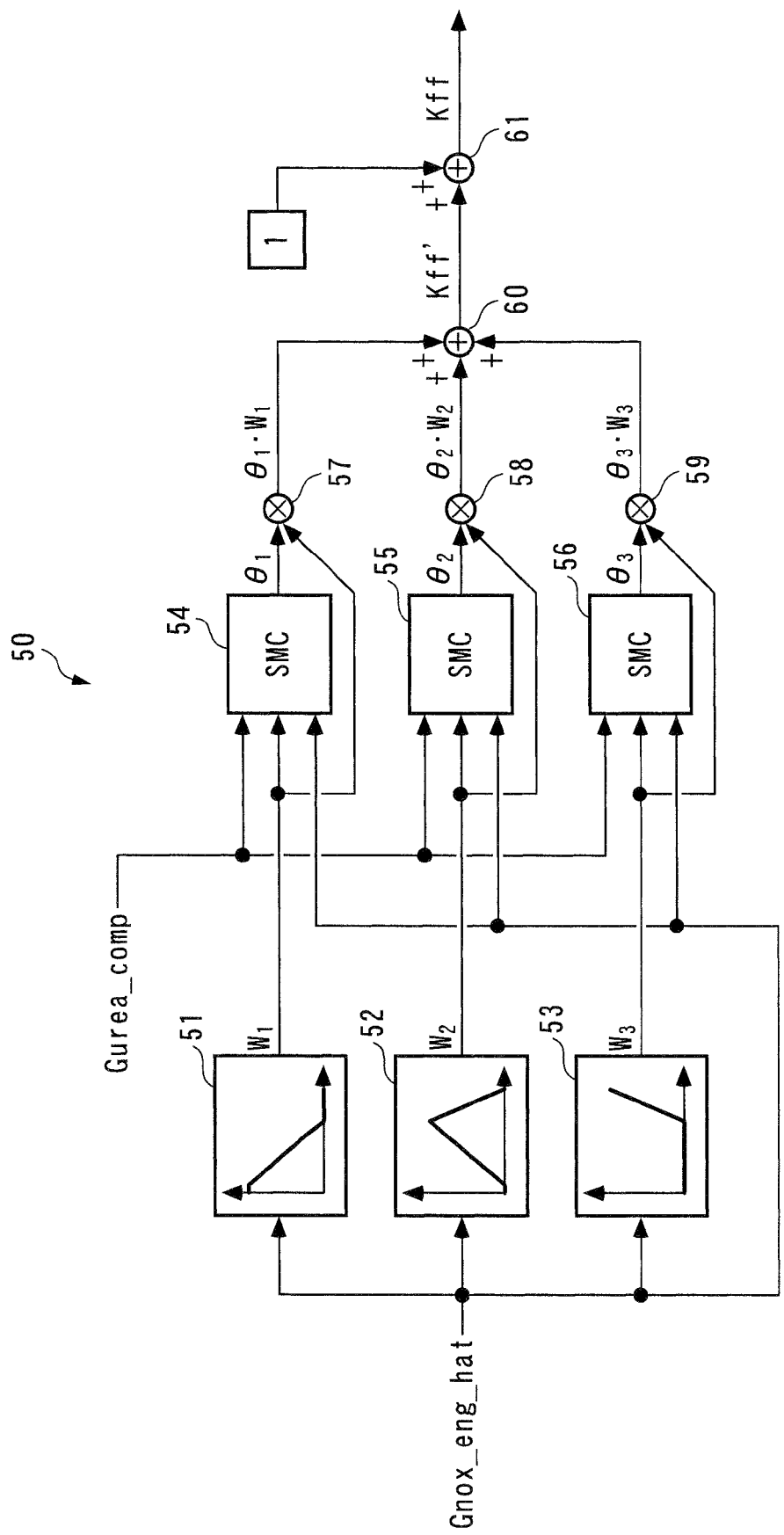
FIG. 12 is a schematic functional block diagram of a model modifier.

Referring to FIG. 12, the model modifier 50 is comprised of three nonlinear weight function-calculating sections 51 to 53, three sliding mode controllers (represented by "SMCs" in FIG. 12) 54 to 56, three multipliers 57 to 59, and two adders 60 and 61.

Figure 13A:
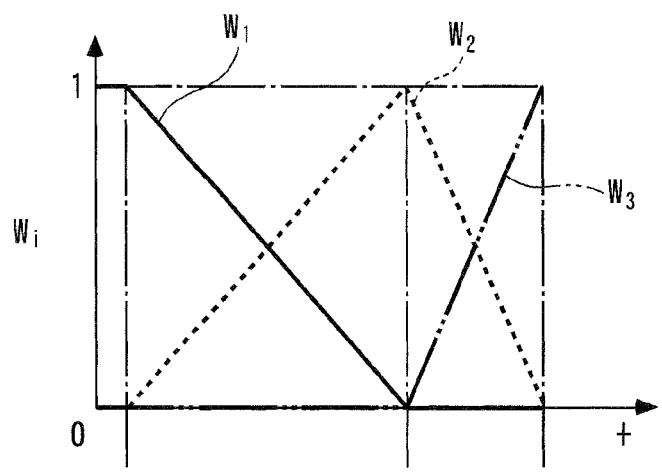
FIG. 13A is a diagram showing an example of a table for use in calculating weight functions $W_i$.

First, the nonlinear weight function-calculating sections 51 to 53 calculate respective values of the three nonlinear weight functions $W_i$ (i=1 to 3) by searching a table shown in FIG. 13A according to the NOx emission amount Gnox_eng_hat, respectively. In FIG. 13A, Gn1 to Gn3 represent predetermined values of the NOx emission amount Gnox_eng_hat, which are set such that 0<Gn1<Gn2<Gn3 holds.

Here, the subscript i of the nonlinear weight function $W_i$ represents each of values associated with three regions, described hereinafter, of the NOx emission amount Gnox_eng_hat. This relationship also applies to various values, described hereinafter. More specifically, a nonlinear weight function $W_1$ is associated with a first region defined as $0 \leq$ Gnox_eng_hat$<$Gn2; a nonlinear weight function $W_2$ is associated with a second region defined as Gn1$<$Gnox_eng_hat$<$Gn3; and a nonlinear weight function $W_3$ is associated with a third region defined as Gn2$<$Gnox_eng_hat.

Further, as shown in FIG. 13A, each of the three nonlinear weight functions $W_i$ is set to a positive value not larger than 1 in the above-described regions associated therewith, and set to 0 in the other regions. Further, the nonlinear weight functions $W_i$ are configured such that two adjacent nonlinear weight functions $W_j$ and $W_{j+1}$, (j=1 or 2) intersect with each other, and the sum of the values of intersecting portions of the two adjacent nonlinear weight functions is equal to the maximum value 1 of the nonlinear weight functions Wi.

Figure 13B:
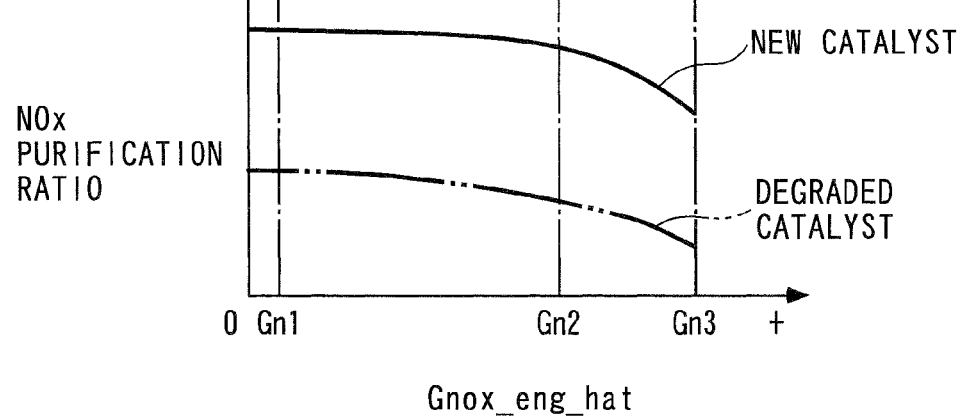
FIG. 13B is a diagram showing examples of NOx purification ratios of the urea selective reduction catalysts in respective new and degraded conditions.

More specifically, the two adjacent nonlinear weight functions $W_1$ and $W_2$ intersect with each other between the predetermined value Gn1 and the predetermined value Gn2, and the NOx emission amount Gnox_eng_hat at the intersection of the two W1 and W2 forms a gradient change point across which the gradient of the NOx purification ratio changes, as shown in FIG. 13B. Similarly, the two adjacent nonlinear weight functions $W_2$ and $W_3$ intersect with each other between the predetermined value Gn2 and the predetermined value Gn3, and the NOx emission amount Gnox_eng_hat at the intersection of the two $W_2$ and $W_3$ forms a gradient change point across which the gradient of the NOx purification ratio changes.

As described above, an intersection of the two adjacent nonlinear weight functions $W_j$ and $W_{j+1}$, (j=1 or 2) is set such that it is associated with the gradient change point of the NOx purification ratio for the following reason: As shown in FIG. 13B, when the urea selective reduction catalyst 7 is degraded, the NOx purification ratio of the urea selective reduction catalyst 7 has the above-described gradient change point, and at the same time changes while maintaining the position of the gradient change point. This makes it necessary to calculate the model modification coefficient Kff such that it has different gradients between regions associated with the gradient change points. Therefore, to make gradients of the model modification coefficient Kff different between regions associated with the gradient change points of the NOx purification ratio, an intersection of two adjacent nonlinear weight functions $W_i$ is set such that it is associated with a gradient change point of the NOx purification ratio.

It should be noted that when the position of a gradient change point of the NOx purification ratio is moved along with degradation of the urea selective reduction catalyst 7, two nonlinear weight functions $W_j$ and $W_{j+1}$ may be set such that they intersect with each other in a region containing gradient change points of the respective NOx purification ratio of the urea selective reduction catalyst 7 in a new condition and the urea selective reduction catalyst 7 in a degraded condition. Further, when a large number of nonlinear weight functions W are set, it is only required to increase the number of nonlinear weight functions W associated with a region containing gradient change points to densely arrange the nonlinear weight functions in the region.

On the other hand, the three sliding mode controllers 54 to 56 calculate three modification coefficients $\theta_i$ (i=1 to 3), respectively. The modification coefficients $\theta_i$ are for modifying the three nonlinear weight functions $W_i$, and as described hereinafter, they are calculated with an algorithm [equations (18) to (25)] to which is applied an adaptive sliding mode control algorithm.

First, a modeling error Eff is calculated by the following equation (18):

$$(k) = \frac{\text{Gurea\_comp}(k)}{\text{Knox\_urea} \cdot \text{Gnox\_eng\_hat}(k)} \cdot 100 \tag{18}$$

In this case, the modeling error Eff is calculated by the above-mentioned equation (18) for the following reason: The model modification coefficient Kff, by which is multiplied the map value Ita_scr_bs, is for calculating the estimated NOx purification ratio Ita_scr_hat, and hence is expressed in units of NOx purification ratio (%). On the other hand, as described hereinbefore, the correction component Gurea_comp is calculated such that Gurea_comp=Uc holds, and hence it is expressed in units of the urea injection amount Gurea. Accordingly, to convert the units of the correction component Gurea_comp into percentage of the NOx purification ratio, the modeling error Eff is calculated by the above-described equation (18).

Next, three distributed errors $Ew_i$ (i=1 to 3) are calculated by the following equation (19), respectively.

$$Ew_j(k) = W_i(k) \cdot Eff(k) \tag{19}$$

As shown in the above equation (19), the three distributed errors $Ew_i$ are calculated by multiplying the modeling error Eff by the three nonlinear weight functions $W_i$, so that they are calculated as values obtained by distributing the modeling error Eff to the aforementioned first to third three regions of the NOx emission amount Gnox_eng_hat.

Then, the three modification coefficients $\theta_i$ are calculated with an adaptive sliding mode control algorithm expressed by the following equations (20) to (25):

$$\sigma w_i(k) = Ew_i(k) + S \cdot Ew_i(k-1) \tag{20}$$

$$\theta rch_i(k) = Krch\_w \cdot \sigma w_i(k) \tag{21}$$

$$\theta adp(k) = \lambda \cdot \theta adp_i(k-1) + Kadp\_w \cdot \sigma w_i(k) \tag{22}$$

When $\theta L \leq \theta_i(k-1) \leq \theta H$ $\lambda=1$ \tag{23}

When $\theta_i(k-1) < \theta L$ or $\theta H < \theta_i(k-1)$ $\lambda = \lambda lmt$ \tag{24}

$$\theta_i(k) = \theta rch_i(k) + \theta adp_i(k) \tag{25}$$

In the above equation (20), $\sigma w_i$ represents a switching function, and S represents a switching function-setting parameter set to a value which satisfies the relationship of $-1 < S < 0$. Further, in the equation (21), $\theta rch_i$ represents a reaching law input, and $Krch_i$ represents a predetermined reaching law gain.

In the equation (22), $\theta adp_i$ represents an adaptive law input, and $Kadp_i$ represents a predetermined adaptive law gain. Further, in the equation (22), $\lambda$ represents a forgetting coefficient, and as shown in the equations (23) and (24), the value thereof is set to 1 or a predetermined value $\lambda lmt$, according to the results of comparison between the immediately preceding value $\theta_i$ (k−1) of the modification coefficient and predetermined upper and lower limit values $\theta H$ and $\theta L$. The upper limit value $\theta H$ is set to a predetermined positive value, and the lower limit value $\theta L$ is set to a predetermined negative value, while the predetermined value $\lambda lmt$ is set to a value which satisfies the relationship of $0 < \lambda lmt < 1$.

Furthermore, as shown in the equation (25), the modification coefficient $\theta_i$ is calculated as the sum of a reaching law input $\theta rch_i$ and an adaptive law input $\theta adp_i$.

The forgetting coefficient $\lambda$ is used in the algorithm for calculating the modification coefficient $\theta_i$ for the following reason: When a large modeling error Eff is caused in the urea selective reduction catalyst 7 by a cause (e.g. a disturbance) other than a change in the NOx purification ratio, the modification coefficient $\theta_i$ is erroneously adapted and temporarily made improper, which degrades transient controllability.

In contrast, in the aforementioned equation (22), when the absolute value of the immediately preceding value $\theta_i(k-1)$ of the modification coefficient is large, to avoid an increase in the adaptive law input $\theta adp_i$, the immediately preceding value $\theta adp_i(k-1)$ of the adaptive law input is multiplied by the forgetting coefficient $\lambda$ which is set to a value within a range of $0<\lambda<1$. In this case, when the aforementioned equation (22) is expanded by a recurrence formula thereof, the immediately preceding value $\theta adp_i(k-1)$ of the adaptive law input calculated in control timing h (h is a natural number not smaller than 2) times earlier is multiplied by $\lambda^h$ ($\approx 0$), so that even when the calculation process proceeds, it is possible to avoid an increase in the adaptive law input $\theta adp_i$. As a result, it is possible to prevent the modification coefficient $\theta_i$ from being erroneously applied and temporarily taking an improper value. This makes it possible to improve controllability in a transient state.

Further, if the forgetting coefficient $\lambda$ is always set to a value within the range of $0<\lambda<1$, when the region of the modification coefficient $\theta_i$ is changed to make $Ew_i$ equal to 0 or when the above-described cause is eliminated to thereby make $Ew_i$ approximately equal to 0, the modification coefficient $\theta_i$ comes to converge to a value close to 0 due to a forgetting effect provided by the forgetting coefficient $\lambda$, so that when a large modeling error Eff occurs again in such a state, it takes time to eliminate the modeling error Eff. Therefore, to avoid the inconvenience and eliminate the modeling error Eff quickly, it is necessary to properly hold the modification coefficient $\theta_i$ at a value capable of compensating for the modeling error Eff even when the absolute value of the modification coefficient $\theta_i$ is relatively small. Therefore, in the present embodiment, when $\theta L \leq \theta_i(k-1) \leq \theta H$ holds, the forgetting coefficient $\lambda$ is set to 1 so as to cancel the forgetting effect provided by the forgetting coefficient $\lambda$. It should be noted that when the forgetting effect by the forgetting coefficient $\lambda$ is always unnecessary, the forgetting coefficient $\lambda$ may be set to 1 in the equation (22) irrespective of the magnitude of the immediately preceding value $\theta_i(k-1)$ of the modification coefficient.

As described above, the three modification coefficients $\theta_i$ are calculated with the adaptive sliding mode control algorithm such that the correction component Gurea_comp for the three regions of the NOx emission amount Gnox_eng_hat with which the three nonlinear weight functions $W_i$ are associated, respectively, becomes equal to 0. Since the correction component Gurea_comp is equal to the control input value Uc, the modification coefficients $\theta_i$ are calculated such that the control input value Uc calculated by the optimum value search controller 30 becomes equal to 0 (i.e. such that the absolute value of the control input value Uc decreases). In other words, the modification coefficients $\theta_i$ are calculated such that the necessity of feedback-controlling the detection signal value Vex to the local minimum value by the control input value Uc decreases.

Next, three products $\theta_i W_i$ are calculated by multiplying the respective modification coefficients $\theta_i$ and the three nonlinear weight functions $W_i$ associated therewith by the three multipliers 57 to 59.

Further, a multiplication sum Kff' is calculated by the adder 60 using the following equation (26):

$$Kff'(k) = \sum_{i=1}^{3} \theta_i(k) \cdot W_i(k) \qquad (26)$$

Then, the model modification coefficient Kff is calculated by the adder 61 using the following equation (27):

$$Kff(k) = 1 + Kff'(k) = 1 + \sum_{i=1}^{3} \theta_i(k) \cdot W_i(k) \qquad (27)$$

As shown in the above equation (27), the model modification coefficient Kff is calculated by adding 1 to the multiplication sum Kff'. This is for causing Ita_scr_hat=Ita_scr_bs to hold in the equation (15) when the modification coefficients $\theta_i$ have all converged to 0.

FIGS. 14A to 14D show examples of calculations of values by the model modifier 50. Referring to FIGS. 14A to 14D, the three products $\theta_i W_i$ are calculated as values which change in a manner different from each other, while the model modification coefficient Kff is calculated as a value which nonlinearly changes with respect to the NOx emission amount Gnox_eng_hat. Thus, it is understood that the map value Ita_scr_bs of the estimated NOx purification ratio can be nonlinearly modified by the model modification coefficient Kff.

As described above, the model modifier 50 calculates the modification coefficients $\theta_i$ such that the necessity of feedback-controlling the detection signal value Vex to the local minimum value by the control input value Uc is reduced, calculates the model modification coefficient Kff while modifying the nonlinear weight functions $W_i$ by the modification coefficients $\theta_i$ calculated as above, and further calculates the estimated NOx purification ratio Ita_scr_hat by modifying the map value Ita_scr_bs using the calculated model modification coefficient Kff. Thus, even when the actual NOx purification ratio of the urea selective reduction catalyst 7 is nonlinearly changed by the above-described various causes, it is possible to calculate the estimated NOx purification ratio Ita_scr_hat while causing the same to be adapted to the above nonlinear changes in the NOx purification ratio. As a result, it is possible to improve the calculation accuracy of the estimated NOx purification ratio Ita_scr_hat.

Next, the urea injection control process executed by the ECU 2 will be described with reference to FIG. 15. This control process is for calculating the urea injection amount Gurea by the aforementioned method, and is carried out at the predetermined control period $\Delta T$, mentioned hereinabove.

First, in a step 1 (shown as S1 in abbreviated form in FIG. 25; the following steps are also shown in abbreviated form), it is determined whether or not a urea failure flag F_UREANG is equal to 1. The urea failure flag F_UREANG is set to 1 when it is determined in a determination process, not shown, that the urea injection device 10 is faulty, and otherwise set to 0.

If the answer to the question of the step 1 is affirmative (YES), i.e. if the urea injection device 10 is faulty, it is determined that injection of urea by the urea injection device 10 should be stopped, and the process proceeds to a step 15, wherein the urea injection amount Gurea is set to 0, followed by terminating the present process.

On the other hand, if the answer to the question of the step 1 is negative (NO), i.e. if the urea injection device 10 is normal, the process proceeds to a step 2, wherein it is determined whether or not a catalyst degradation flag F_SCRNG is equal to 1. If the answer to this question is negative (NO), i.e. if the urea selective reduction catalyst 7 is not degraded, the process proceeds to a step 3, wherein it is determined whether or not a urea remaining amount Qurea is smaller than a predetermined value Qref.

If the answer to this question is affirmative (YES), i.e. if the urea remaining amount Qurea is small, the process proceeds to a step 14, wherein to indicate the fact, the urea remaining amount warning lamp 26 is turned on. Then, to stop injection of urea, the urea injection amount Gurea is set to 0 in the above-mentioned step 15, followed by terminating the present process. It should be noted that in the step 14, a warning sound may be generated for notifying a driver of the urea remaining amount Qurea being small in addition to lighting of the urea remaining amount warning lamp 26.

On the other hand, if the answer to the question of the step 3 is negative (NO), i.e. if the urea remaining amount Qurea is large, the process proceeds to a step 4, wherein it is determined whether or not a catalyst warmup timer value Tmast is larger than a predetermined value Tmlmt. The catalyst warmup timer value Tmast is for counting a time period it takes to warm up the catalyst after the start of the engine 3.

If the answer to the question of the step 4 is negative (NO), it is determined that injection of urea should be stopped since the oxidation catalyst is not yet activated, and the urea injection amount Gurea is set to 0 in the aforementioned step 15, followed by terminating the present process.

On the other hand, if the answer to the question of the step 4 is affirmative (YES), it is determined that the oxidation catalyst is active, and the process proceeds to a step 5, wherein it is determined whether or not the catalyst temperature Tscr is higher than a predetermined value Tscr_act. If the answer to this question is negative (NO), it is determined that injection of urea should be stopped since the oxidation catalyst is not yet activated, and the urea injection amount Gurea is set to 0 in the aforementioned step 15, followed by terminating the present process.

On the other hand, if the answer to the question of the step 5 is affirmative (YES), it is determined that the urea selective reduction catalyst 7 is active, and the process proceeds to a step 6, wherein the FB injection amount Gurea_fb is calculated by the aforementioned equations (2) to (11), and the correction component Gurea_comp is calculated by the aforementioned equation (12).

Subsequently, the process proceeds to a step 7, wherein the FF injection amount Gurea_ff is calculated by the aforementioned equations (14) to (17). After that, in a step 8, the urea injection amount Gurea is set to the sum (Gurea_fb+Gurea_ff) of the FB injection amount and the FF injection amount.

In a step 9 following the step 8, the model modification coefficient Kff is calculated by the aforementioned equations (18) to (27). Next, the process proceeds to a step 10, wherein it is determined whether or not any of the following four conditions (f1) to (f4) is satisfied. It should be noted that the following θref represents a reference value for determining the degradation of the urea selective reduction catalyst 7, and is set to a predetermined negative value (e.g. −0.8). Further, Kref as well represents a reference value (predetermined value) for determining the degradation of the urea selective reduction catalyst 7, and is set to a predetermined positive value (e.g. 0.2) smaller than 1.

$$\theta_1 \leq \theta ref \quad (f1)$$

$$\theta_2 \leq \theta ref \quad (f2)$$

$$\theta_3 \leq \theta ref \quad (f3)$$

$$Kff \leq Kref \quad (f4)$$

If the answer to the question of the step 10 is negative (NO), i.e. if none of the above-described four conditions (f1) to (f4) are satisfied, it is determined that the urea selective reduction catalyst 7 is not degraded, and the process proceeds to a step 11, wherein to indicate that the urea selective reduction catalyst 7 is not degraded, the catalyst degradation flag F_SCRNG is set to 0, followed by terminating the present process.

On the other hand, if the answer to the question of the step 10 is affirmative (YES), i.e. if any of the above-described four conditions (f1) to (f4) is satisfied, it is determined that the urea selective reduction catalyst 7 is degraded, and the process proceeds to a step 12, wherein to indicate the degradation of the urea selective reduction catalyst 7, the catalyst degradation flag F_SCRNG is set to 1, followed by terminating the present process.

As described above, when the catalyst degradation flag F_SCRNG is set to 1 in the step 12, in the following control timings, the answer to the question of the step 2 becomes affirmative (YES). In this case, the process proceeds to a step 13, wherein to indicate the degradation of the urea selective reduction catalyst 7, the urea remaining amount warning lamp 26 is turned on. Then, to stop injection of urea, the urea injection amount Gurea is set to 0 in the above-described step 15, followed by terminating the present process. It should be noted that in the step 13, a warning sound may be generated for notifying the driver of the degradation of the urea selective reduction catalyst 7 in addition to lighting of the catalyst degradation warning lamp 25.

Figure 16:
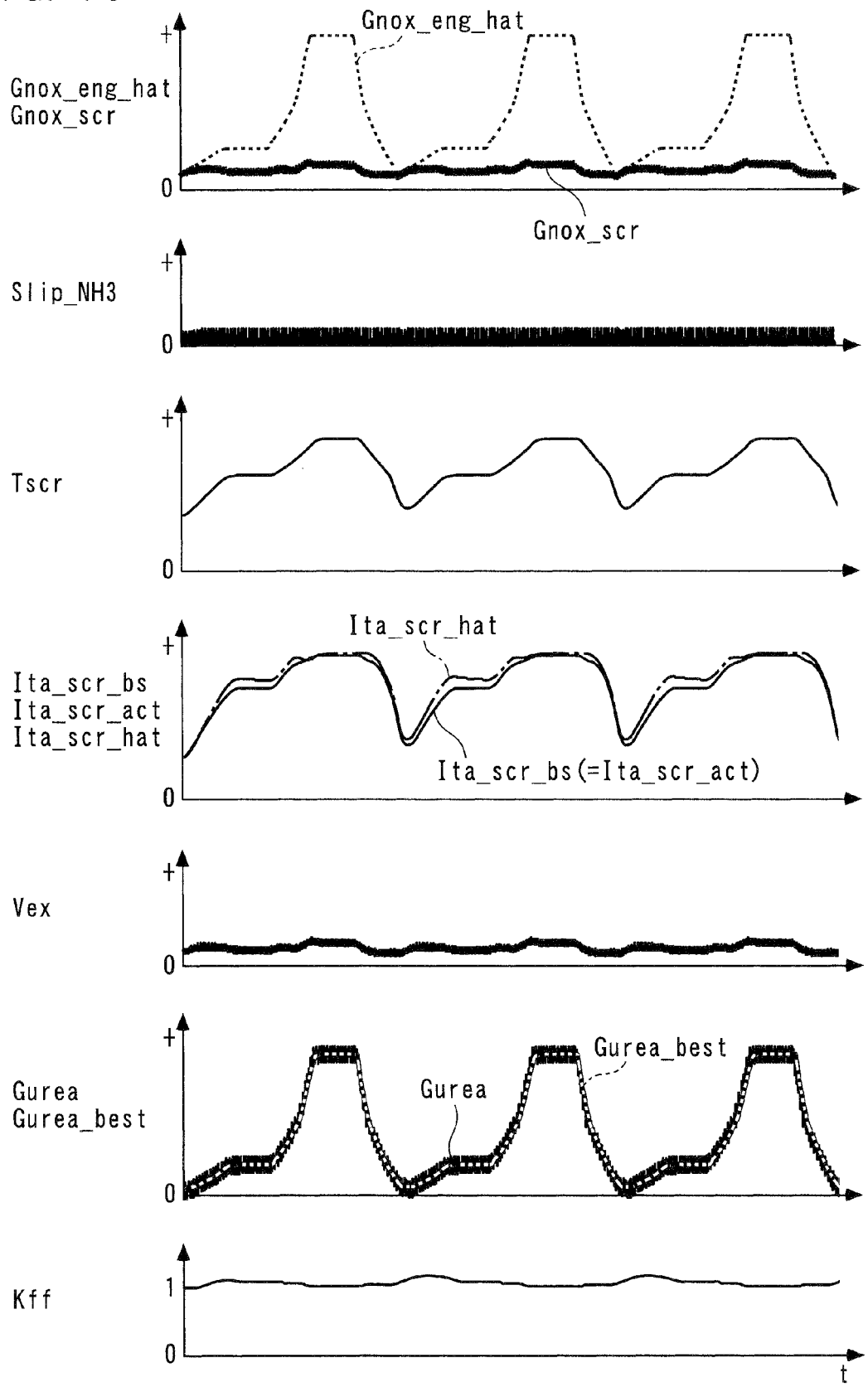
FIG. 16 is a timing diagram showing an example of results of a simulation of urea injection control, which is performed assuming that there is no modeling error.
Figure 17:
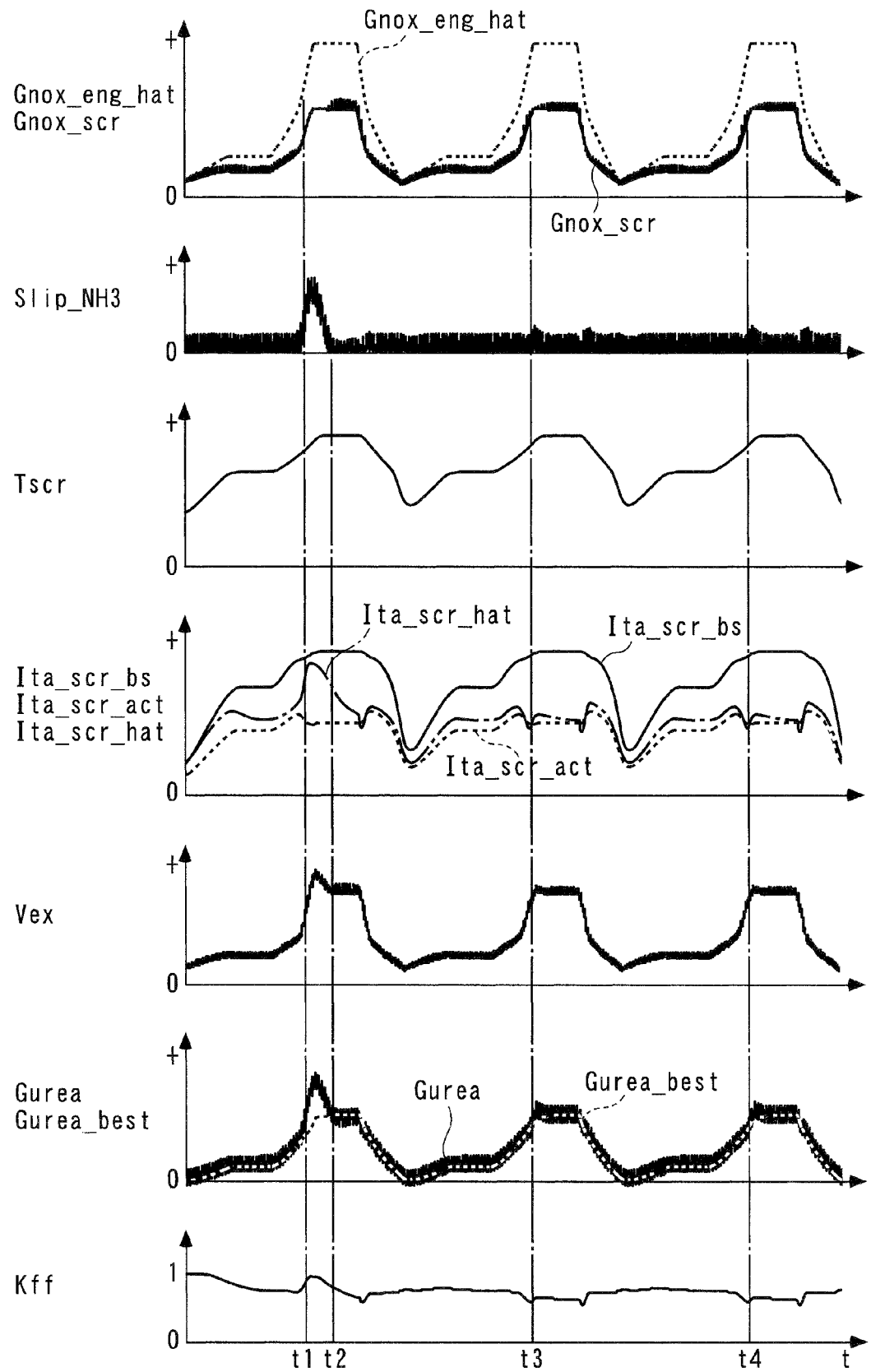
FIG. 17 is a timing diagram showing an example of results of a simulation of urea injection control, which is performed assuming that there is a modeling error.

Next, results (hereinafter referred to as "the control results") of simulations of the urea injection control carried out by the exhaust emission control device 1 according to the present embodiment will be described with reference to FIGS. 16 to 21. First, FIGS. 16 and 17 show examples of the control results by the exhaust emission control device 1 according to the present embodiment. Particularly, FIG. 16 shows examples of control results obtained when there is no modeling error in the FIG. 10 map, and FIG. 17 shows examples of control results obtained when there is a modeling error in the FIG. 10 map.

Figure 18:
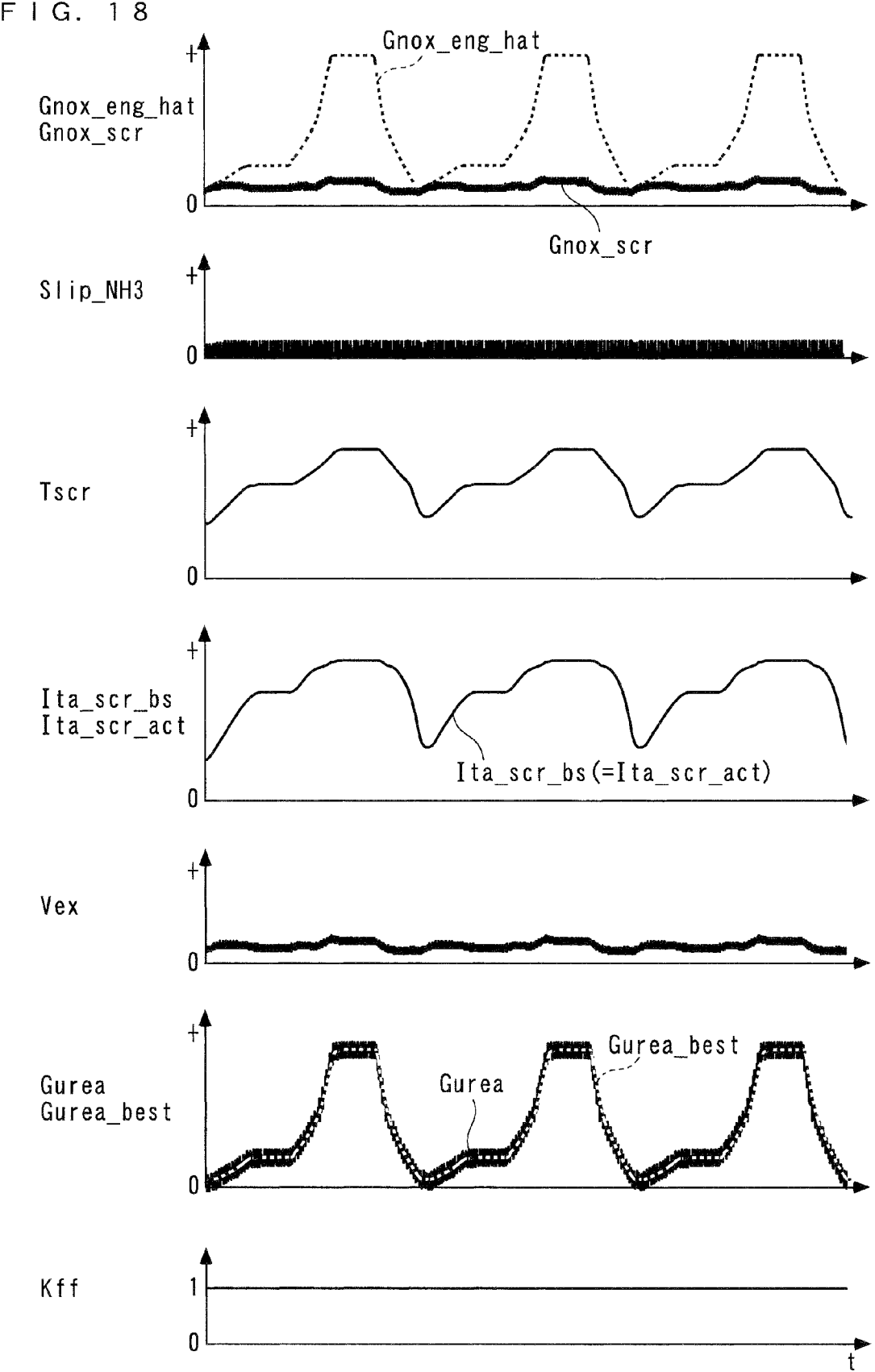
FIG. 18 is a timing diagram showing an example of results of a simulation of urea injection control, which is performed assuming that Kff is set to 1 and there is no modeling error.
Figure 19:
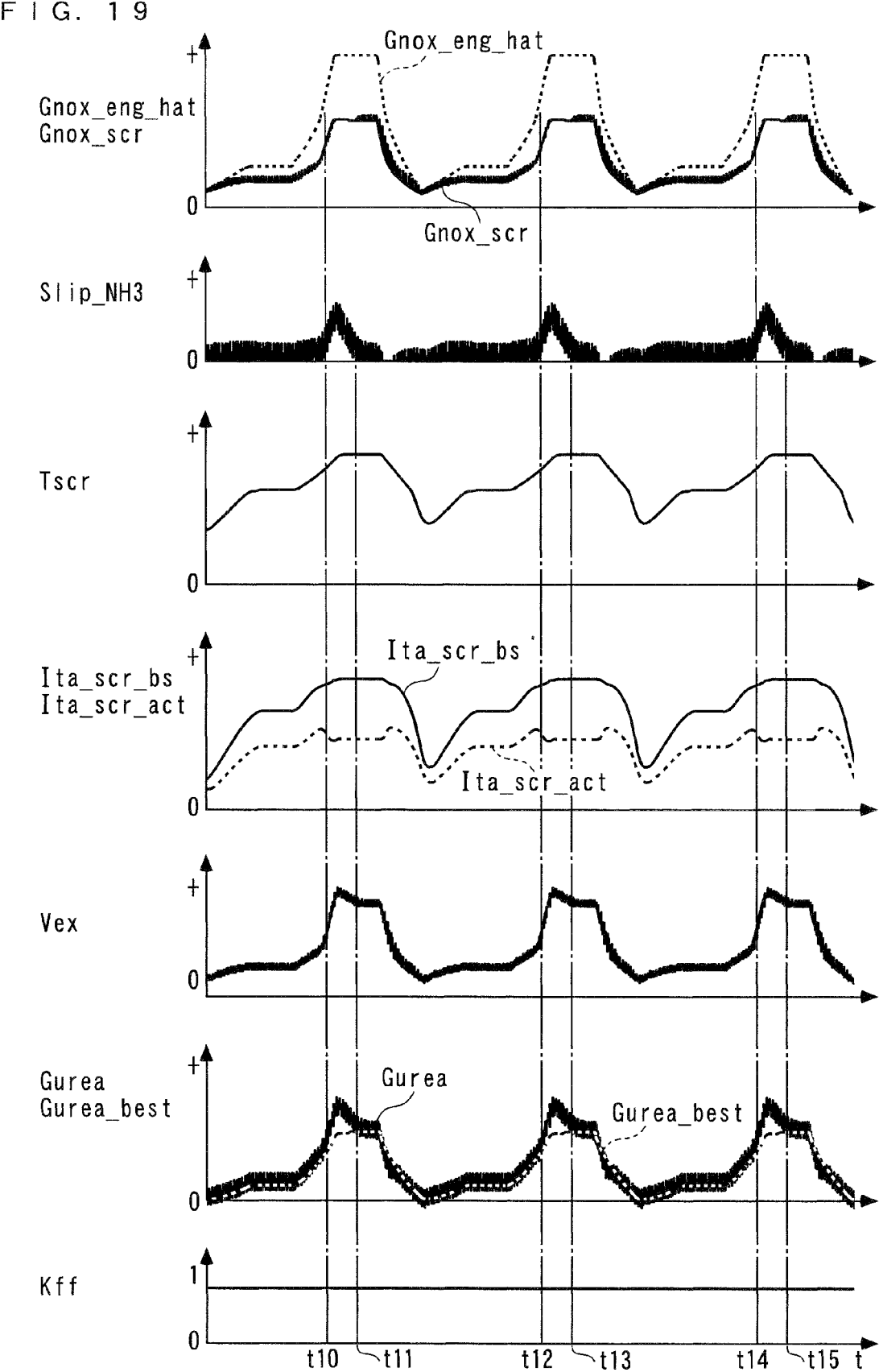
FIG. 19 is a timing diagram showing an example of results of a simulation of urea injection control, which is performed assuming that Kff is set to 1 and there is a modeling error.

For comparison, FIG. 18 and FIG. 19 show examples of the control results obtained when there is no modeling error and when there is a modeling error, respectively, by omitting only the model modifier 50 of the exhaust emission control device 1, i.e. by setting Kff to 1. Further, for comparison, FIG. 20 and FIG. 21 show examples of the control results obtained when there is no modeling error and when there is a modeling error, respectively, in the case of both the optimum value search controller 30 and the model modifier 50 being omitted, i.e. Gurea_fb being set to 0 and Kff being set to 1.

In FIGS. 16 to 21, Gnox_scr represents a post-catalyst NOx amount which indicates the amount of NOx in exhaust gases on the downstream side of the urea selective reduction catalyst 7, Slip_NH3 represents a slip value which indicates the amount of ammonia in exhaust gases on the downstream side of the urea selective reduction catalyst 7. Further, Ita_scr_act represents an actual value of the NOx purification ratio of the urea selective reduction catalyst 7. Therefore, when there is no modeling error in the FIG. 10 map, Ita_scr_bs=Ita_scr_act holds, whereas when there is a modeling error in the FIG. 10 map, Ita_scr_bs>Ita_scr_act holds. Further, Gurea_best represents the optimum value of the urea injection amount Gurea, which is capable of causing the detection signal value Vex of the signal from the exhaust gas concentration sensor 22 to converge to the local minimum value.

Figure 20:
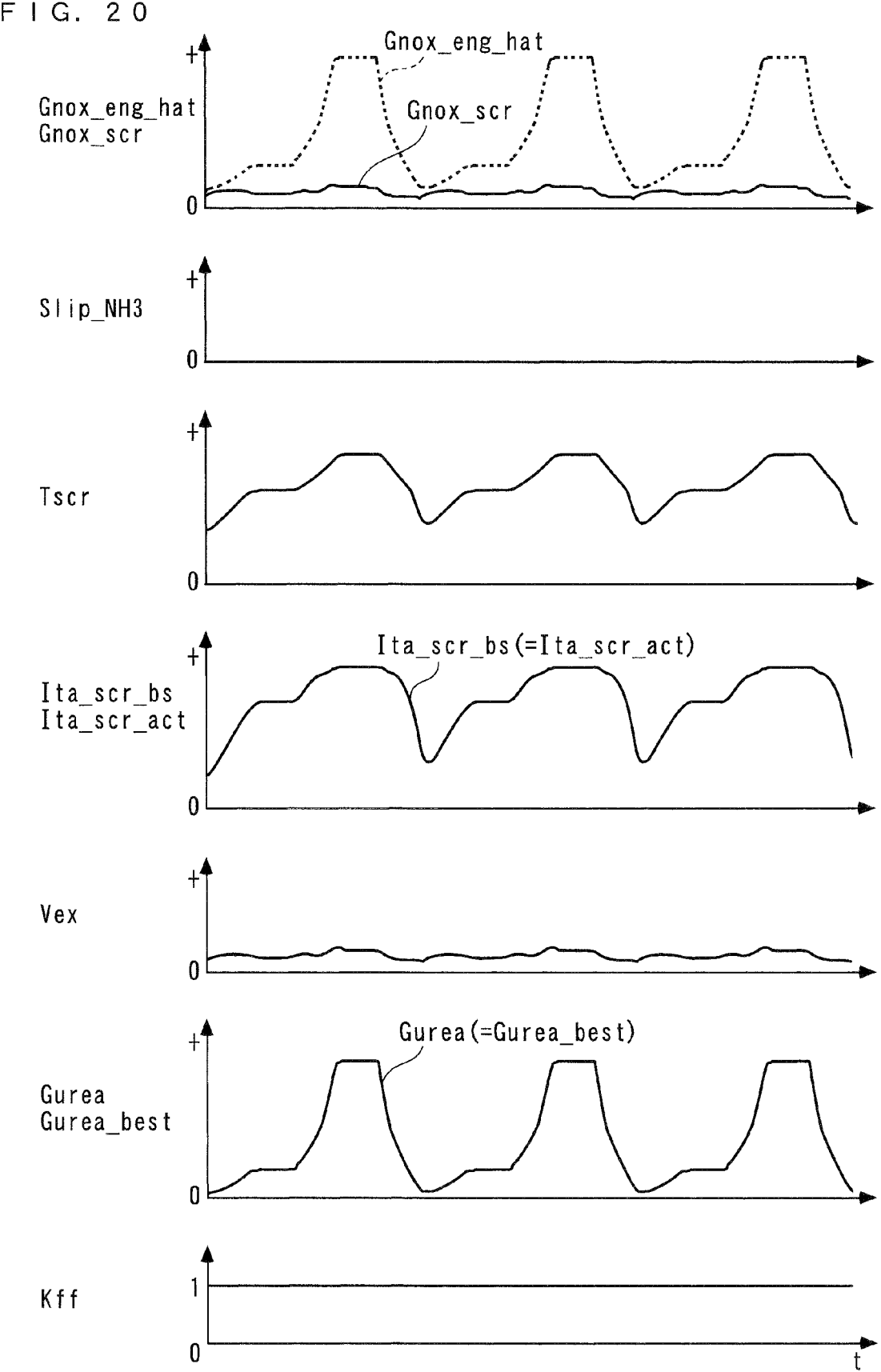
FIG. 20 is a timing diagram showing an example of results of a simulation of urea injection control, which is performed assuming that Gurea_fb being set to 0 and Kff to 1 when there is no modeling error.
Figure 21:
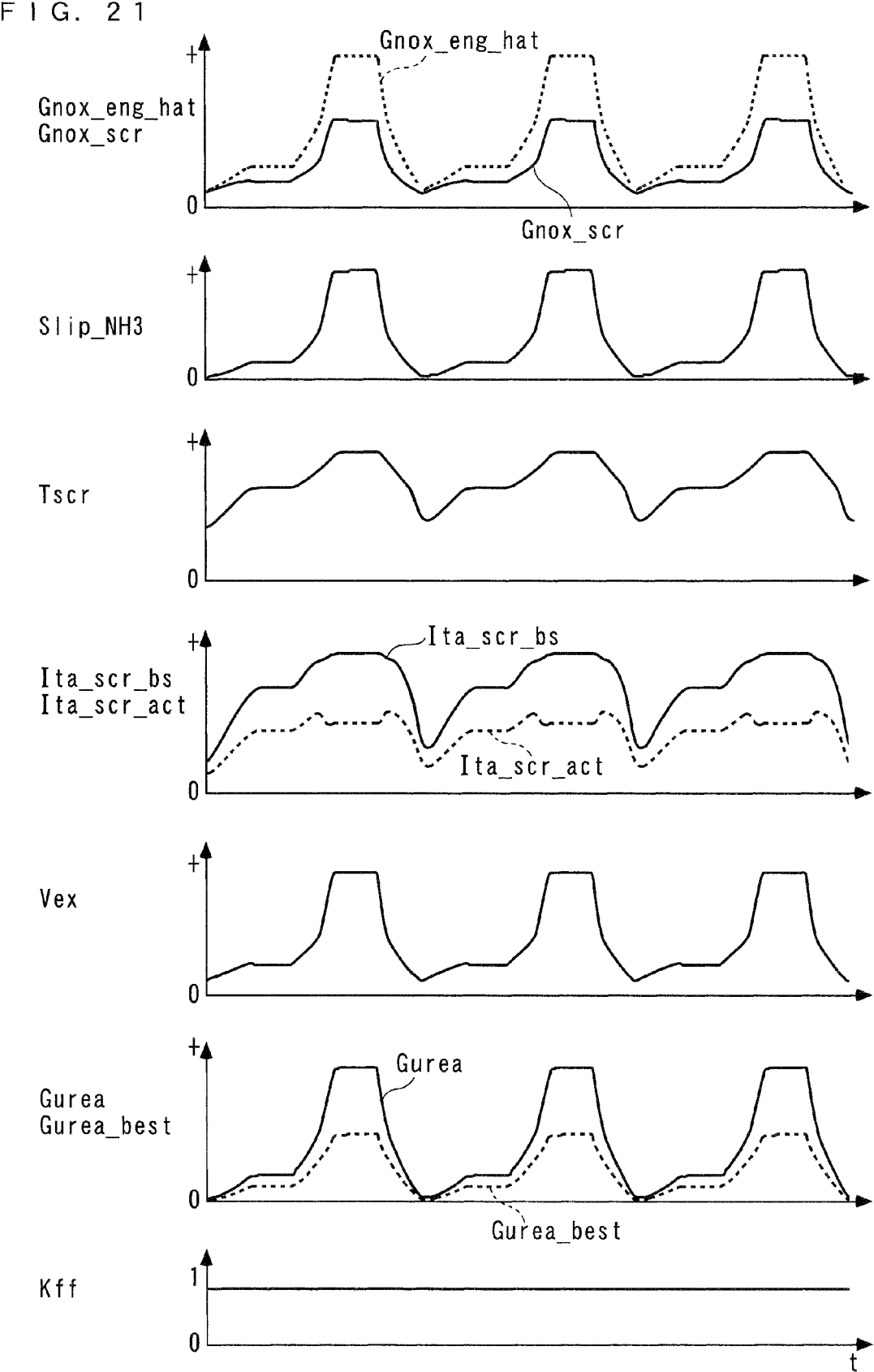
FIG. 21 is a timing diagram showing an example of results of a simulation of urea injection control, which is performed assuming that Gurea_fb is set to 0 and Kff to 1, with no modeling error.

First, in a case where both the optimum value search controller 30 and the model modifier 50 are omitted, when there is no modeling error as shown in FIG. 20, it is understood that the urea injection amount Gurea (=Gurea_ff) takes the optimum value Gurea_best, and the slip value slip_NH3 is held at approximately 0, which ensures excellent reduction of exhaust emissions. However, as shown in FIG. 21, when a modeling error is caused by a decrease in the NOx purification ratio e.g. due to degradation, it is understood that the urea injection amount Gurea largely deviates from the optimum value Gurea_best along with an increase in the NOx emission amount Gnox_eng_hat, and the slip value Slip_NH3 largely increases, which largely increase exhaust emissions.

Further, in a case where the model modifier 50 is omitted, it is understood that when there is no modeling error as shown in FIG. 18, the urea injection amount Gurea takes a value approximately equal to the optimum value Gurea_best, and the slip value Slip_NH3 is held at a very small value, thereby ensuring excellent reduction of exhaust emissions. However, as shown in FIG. 19, when there is a modeling error, it is understood that the urea injection amount Gurea temporally deviates from (i.e. overshoots) the optimum value Gurea_best along with a periodic increase in the NOx emission amount Gnox_eng_hat, which causes a temporal increase in the slip value Slip_NH3, and such a state is repeatedly caused between time points t10 and t11, t12 and t13, and t14 and t15, thereby increasing exhaust emissions.

On the other hand, in the exhaust emission control device 1 according to the present embodiment, as shown in FIG. 16, when there is no modeling error, it is understood that similarly to the FIG. 18 control results described above, the urea injection amount Gurea takes the optimum value Gurea_best, and the slip value Slip_NH3 is held at a very small value, thereby ensuring an excellent reduction of exhaust emissions.

Further, as shown in FIG. 17, when there is a modeling error, the urea injection amount Gurea temporally deviates from the optimum value Gurea_best between time points t1 and t2, and the slip value Slip_NH3 temporally increases at a first increase in the NOx emission amount Gnox_eng_hat that periodically increases. However, it is understood that at second and third increases in the NOx emission amount Gnox_eng_hat, after a time point t3 and also after a time point t4, the urea injection amount Gurea takes a value approximately equal to the optimum value Gurea_best and the slip value Slip_NH3 is held at a very small value, thereby ensuring an excellent reduction of exhaust emissions. This is because in the urea injection control process, as the calculation proceeds, the modification coefficients $\theta_j$, i.e. the model modification coefficient Kff is calculated so as to compensate for the modeling error in the FIG. 10 map, whereby the estimated NOx purification ratio Ita_scr_hat becomes closer to the actual value Ita_scr_act.

As described above, according to the exhaust emission control device 1 of the present embodiment, the optimum value search controller 30 calculates the moving average value Cr, which represents the correlation between the detection signal value Vex of the signal from the exhaust gas concentration sensor 22 and the reference input Ref, based on the detection signal value Vex and the reference input Ref, calculates the control input value Uc such that the moving average value Cr converges to 0, and calculates the urea injection amount Gurea such that it contains the control input Uc. In this case, as described heretofore, as the detection signal value Vex is closer to the local minimum value, the moving average value Cr becomes closer to 0, and hence by the control input value Uc, it is possible to cause the detection signal value Vex to converge to the local minimum value. Further, when the detection signal value Vex of the signal from the exhaust gas concentration sensor 22 takes the local minimum value, the urea injection amount Gurea takes the optimum value which is capable of reducing both the concentration of ammonia and that of NOx in exhaust gases on the downstream side of the urea selective reduction catalyst 7 in a well-balanced manner. Therefore, by using the control input value Uc, it is possible to control the urea injection amount Gurea to the optimum value described above, thereby making it possible to reduce both the concentration of ammonia and that of NOx in exhaust gases on the downstream side of the urea selective reduction catalyst 7 in a well-balanced manner. As a result, even when the NOx purification ratio of the urea selective reduction catalyst 7 is changed by various causes, it is possible to maintain high NOx purification ratio and very low reduced exhaust emissions.

Further, the control input value Uc is calculated with the sliding mode control algorithm [the equations (7) to (10)] such that the moving average value Cr converges to 0, and therefore when the detection signal value Vex has become close to the local minimum value or its vicinity, i.e. even when the urea injection amount Gurea has become close to the optimum value or its vicinity, it is possible not only to cause the urea injection amount Gurea to exponentially converge to the optimum value without causing an oscillating behavior or unstable behavior but also to maintain the urea injection amount Gurea at the optimum value or in its vicinity after conversion. This makes it possible not only to cause the detection signal value Vex to exponentially converge to the local minimum value but also to maintain the detection signal value Vex at the local minimum value or in its vicinity after conversion. As a result, even when the NOx purification ratio of the urea selective reduction catalyst 7 is changed by various causes, it is possible to further enhance the NOx purification ratio and reduce exhaust emissions.

Furthermore, the moving average value Cr is calculated by integrating the product Z over the moving average section Nref·ΔT, which is a section of an integral multiple of predetermined repetition period Tref of the reference input Ref, so that it is possible to prevent the frequency of the reference input Ref from being mixed with the control input value Uc, thereby making it possible to avoid circulation of the frequency component of the reference input Ref in the closed loop including the optimum value search controller 30. This makes it possible to ensure stability of the control system.

Further, the FF controller 40 calculates the map value Ita_scr_bs of the estimated NOx purification ratio by searching the FIG. 10 map according to the urea catalyst temperature Tscr and the NOx emission amount Gnox_eng_hat, calculates the estimated NOx purification ratio Ita_scr_hat by modifying the map value Ita_scr_bs by the model modification coefficient Kff, and calculates the FF injection amount Gurea_ff based on the estimated NOx purification ratio Ita_scr_hat. Then, the FF controller 40 calculates the urea injection amount Gurea by adding the FB injection amount Gurea_fb to the FF injection amount Gurea_ff. That is, the urea injection amount Gurea is calculated by correcting the FF injection amount Gurea_ff by the FB injection amount Gurea_fb.

As described above, when the urea injection amount Gurea is controlled while correcting the FF injection amount Gurea_ff by the FB injection amount Gurea_fb, there is a fear that response delay is caused before the results of correction of the urea injection amount Gurea are reflected on the detection signal value Vex of the signal from the exhaust gas concentration sensor 22, since the FB injection amount Gurea_fb is calculated based on the detection signal value Vex. In contrast, the FF controller 40 calculates the FF injection amount Gurea_ff with the feedforward control algorithm, as described hereinbefore, and hence it is possible to properly supply a reducing agent to the urea selective reduction catalyst 7 without causing the above-described response delay.

Further, the model modifier 50 calculates the modification coefficients $\theta_i$ such that the correction component Gurea_comp, i.e. the control input value Uc converges to 0, and calculates the model modification coefficient Kff using the thus calculated modification coefficients $\theta_i$. The reduced NOx amount-calculating section 42 calculates the estimated NOx purification ratio Ita_scr_hat by modifying the map value Ita_scr_bs of the estimated NOx purification ratio by the model modification coefficient Kff, so that even when the actual NOx purification ratio of the urea selective reduction catalyst 7 is changed by various causes, it is possible to properly calculate the estimated NOx purification ratio Ita_scr_hat while coping the change in the actual NOx purification ratio. For the above reason, it is possible to maintain a high NOx purification ratio and very low exhaust emissions.

Further, the model modifier 50 calculates the model modification coefficient Kff by multiplying the modification coefficients $\theta_i$ by the nonlinear weight functions $W_i$ and adding the multiplication sum Kff', which is the total sum of the products $\theta_i W_i$ obtained by the above multiplication, to 1. Therefore, when the actual relationship between the NOx emission amount Gnox_eng_hat and the NOx purification ratio suffers from a local error or a change due to aging in any of the above-described three regions, or even when there is variation in the above actual relationship between the three regions, the relationship between the NOx emission amount Gnox_eng_hat and the estimated NOx purification ratio Ita_scr_hat can be caused to properly match the actual relationship. As a result, even when a modeling error is caused in the FIG. 10 map due to degradation of the urea selective reduction catalyst 7 or variation in NOx-purifying capability between individual urea selective reduction catalysts (i.e. even when the map value Ita_scr_bs deviates from the actual NOx purification ratio), it is possible to properly compensate for the modeling error.

In addition, each of the three nonlinear weight functions $W_i$ is set to a positive value not larger than 1 in the above-described region associated therewith, and to 0 in the other regions. Furthermore, two adjacent nonlinear weight functions $W_j$ and $W_{j+1}$, (j=1 or 2) intersect with each other, and the sum of the values of intersecting portions of the two adjacent nonlinear weight functions is set such that it becomes equal to the maximum value of 1 of the nonlinear weight functions $W_j$. Therefore, in modifying the map value Ita_scr_bs, it is possible to modify the same continuously over the three regions, so that the modified map value Ita_scr_bs comes to have no discontinuities. This makes it possible to prevent the estimated NOx purification ratio Ita_scr_hat from becoming temporarily improper due to the discontinuities of the map value Ita_scr_bs.

Further, in the model modifier 50, as described hereinabove, the correction component Gurea_comp for use in calculating the modeling error is the control input value Uc which is calculated such that the frequency of the reference input Ref is prevented from being mixed therewith, so that it is possible to avoid circulation of the frequency component of the reference input Ref in the closed loop including the FF controller 40. This makes it possible to ensure stability of the control system.

Figure 15:
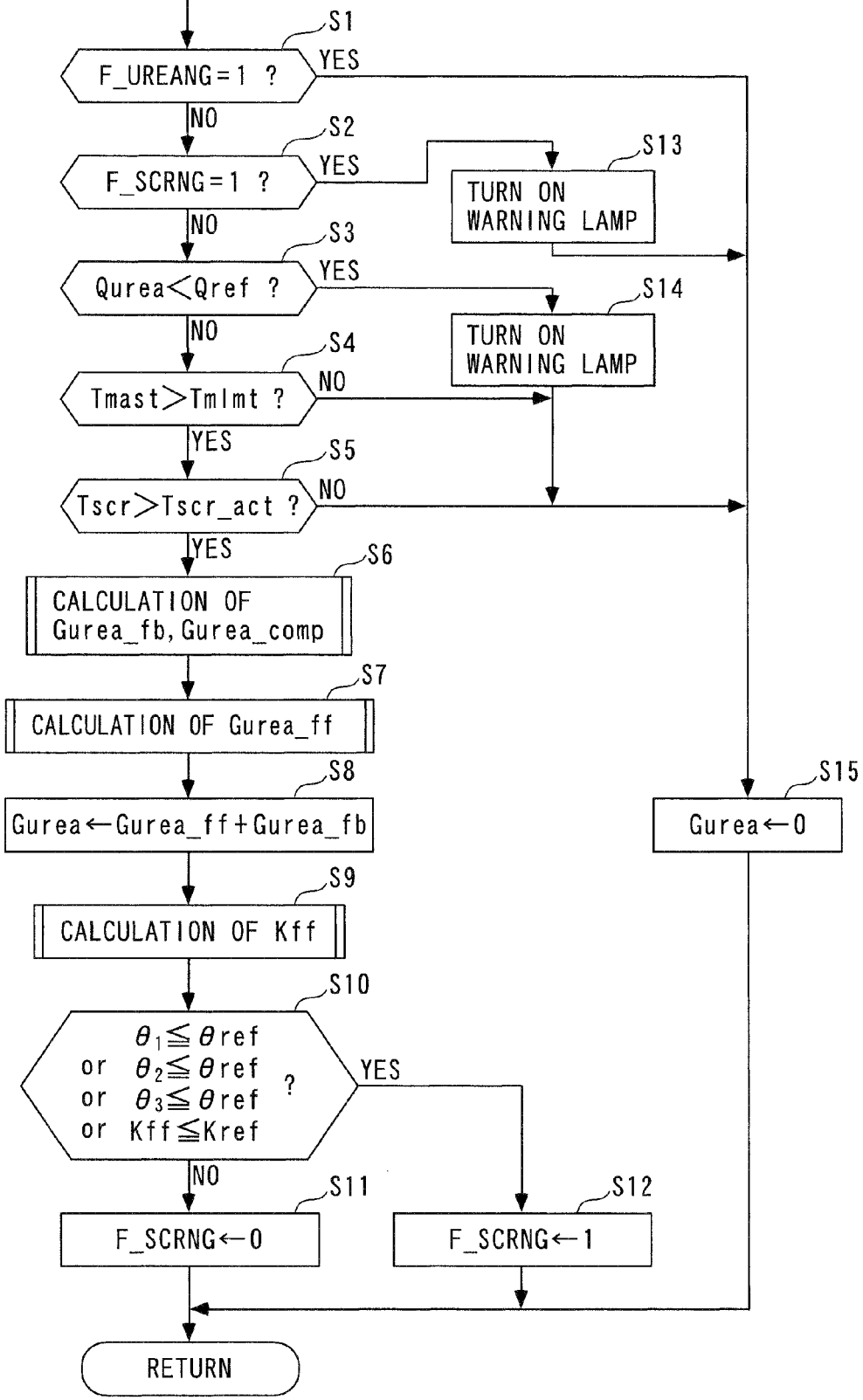
FIG. 15 is a flowchart of a urea injection control process.

Furthermore, in the urea injection control process shown in FIG. 15, when the model modification coefficient Kff becomes larger than the predetermined value Kref, it is determined that the urea selective reduction catalyst 7 is degraded, and the catalyst degradation warning lamp 25 is turned on, whereby it is possible to properly notify the driver of the degradation of the urea selective reduction catalyst 7. This makes it possible to prevent operation of the engine 3 from being continued in spite of degradation of the urea selective reduction catalyst 7, thereby making it possible to prevent exhaust emissions from being increased. In addition, when it is determined that the urea selective reduction catalyst 7 is degraded, the urea injection amount Gurea is calculated such that it becomes equal to 0, and injection of urea is stopped. This stops the reducing agent from being supplied to the urea selective reduction catalyst 7 in spite of degradation of the catalyst 7, whereby it is possible to prevent the reducing agent from flowing out downstream of the urea selective reduction catalyst 7, which makes it possible to avoid an increase in exhaust emissions.

It should be noted that although in the present embodiment, for ease of understanding, only the urea selective reduction catalyst 7 is shown in the exhaust passage 5 of the engine 3, and the other exhaust devices are omitted in FIG. 1, by way of example, the layout of the exhaust system for the engine 3, to which is applied the exhaust emission control device 1 according to the invention, is not limited to this, but the exhaust system may be configured such that various catalysts and filters are arranged in the exhaust passage 5. For example, when the engine 3 is a gasoline engine, e.g. a three-way catalyst may be disposed at a location upstream or downstream of the urea selective reduction catalyst 7. On the other hand, when the engine 3 is a diesel engine, an oxidation-reduction catalyst and a DPF (Diesel Particulate Filter), for example, may be arranged at locations upstream or downstream of the urea selective reduction catalyst 7. Also when the exhaust system is configured as above, it is possible to obtain the same advantageous effects as provided by the above-described embodiment.

Further, although in the present embodiment, the exhaust gas concentration sensor 22 is used as the exhaust gas concentration-detecting means, by way of example, the exhaust gas concentration-detecting means of the present invention is not limited to this, but any suitable exhaust gas concentration-detecting means may be used insofar as it delivers detection signals indicative of the detected concentration of NOx and that of a reducing agent in exhaust gases, and has a characteristic that the direction of a change in a detection signal value responsive to an increase/decrease of the NOx concentration is the same as the direction of a change in the value of the detection signal responsive to an increase/decrease of the concentration of the reducing agent. For example, an exhaust gas concentration sensor that detects the concentration of urea and that of NOx in exhaust gases, and delivers a signal indicative of the detected concentration of urea and that of NOx may be used as the exhaust gas concentration-detecting means.

Figure 22A:
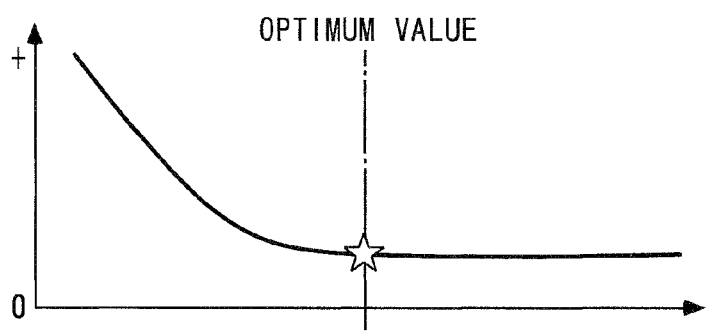
FIGS. 22A to 22E are diagrams which are useful in explaining a variation of exhaust gas concentration-detecting means.
Figure 22B:
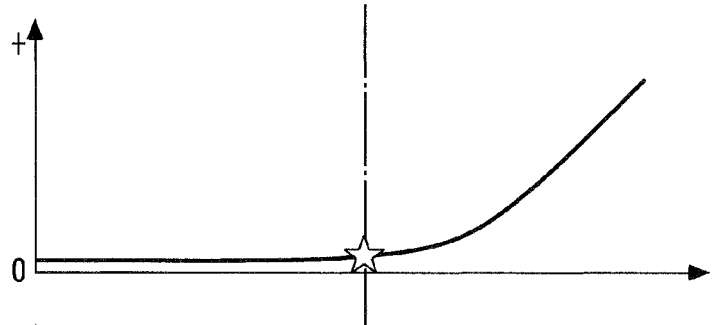
Figure 22C:
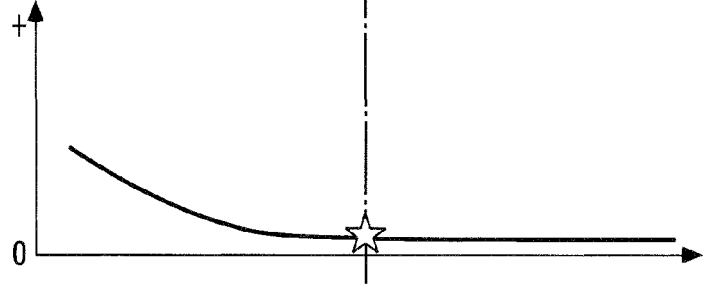
Figure 22D:
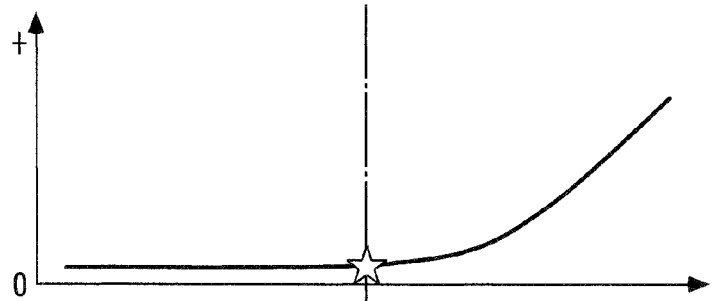

Further, the exhaust gas concentration-detecting means may be constructed as follows: A NOx concentration sensor for detecting only the concentration of NOx in exhaust gases, and an ammonia concentration sensor for detecting only the concentration of ammonia in exhaust gases are arranged in the exhaust passage at locations downstream of the urea selective reduction catalyst, and these sensors are electrically connected to the ECU 2. In this case, as the NOx concentration sensor, a NOx concentration sensor is employed which has a characteristic that when the concentration of NOx in exhaust gases changes as shown in FIG. 22A, a detection signal value Vnox of a signal from the NOx concentration sensor changes as shown in FIG. 22C, and as the ammonia concentration sensor, an ammonia concentration sensor is employed which has a characteristic that when the concentration of ammonia in exhaust gases changes as shown in FIG. 22B, a detection signal value Vnh3 of a signal from the ammonia concentration sensor changes as shown in FIG. 22D.

Figure 22E:
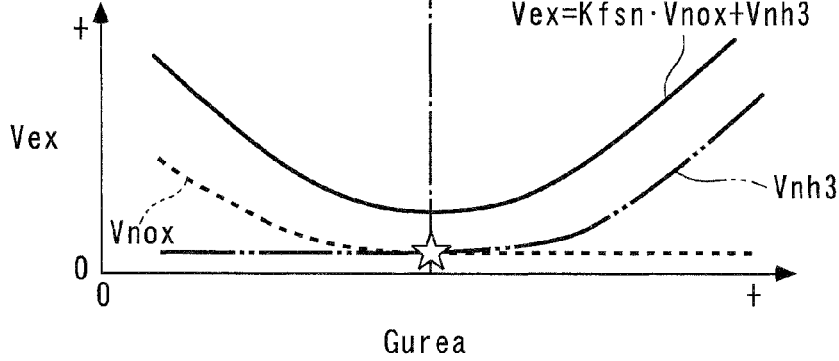

Then, as shown in FIG. 22E, the ECU 2 combines the detection signal value Vnox of the signal from the NOx concentration sensor and the detection signal value Vnh3 of the signal from the ammonia concentration sensor, to thereby calculate the detection signal value Vex. More specifically, the detection signal value Vex is calculated by the following equation (28):

$$Vex(k) = Kfsn \cdot Vnox(k) + tnh3(k) \tag{28}$$

In the above equation (28), Kfsn represents a predetermined composite coefficient, and as shown in FIG. 22E, is set to a value which is capable of making the curve of the detection signal value Vex as symmetrical as possible with respect to the optimum value of the urea injection amount Gurea as the center.

Also when the detection signal value Vex calculated by the method as described above is used, it is possible to obtain the same advantageous effects as provided by the above-described embodiment. It should be noted that in the above example, the NOx concentration sensor corresponds to the NOx concentration-detecting means, the ammonia concentration sensor corresponds to the reducing agent concentration-detecting means, and the ECU 2 corresponds to the detection signal value-calculating means.

Figure 23:
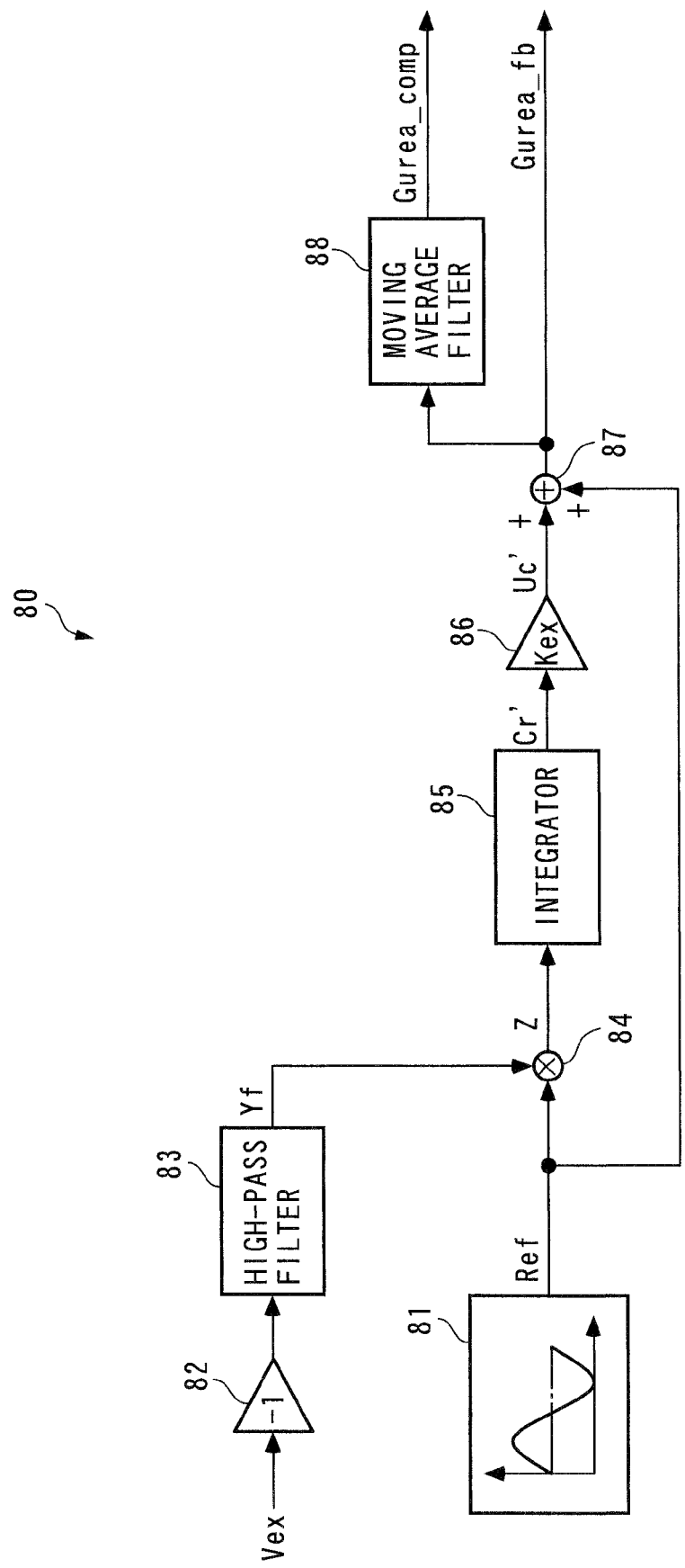
FIG. 23 is a schematic functional block diagram of a variation of the optimum value search controller.

Further, the optimum value search controller 30 according to the above-described embodiment may be replaced by an optimum value search controller 80 shown in FIG. 23. The optimum value search controller 80 is for calculating the FB injection amount Gurea_fb and the correction component Gurea_comp by a method, described hereinafter. As shown in FIG. 23, the optimum value search controller 80 is comprised of a reference input-calculating section 81, an inverting amplifier 82, a high-pass filter 83, a multiplier 84, an integrator 85, an amplifier 86, an adder 87, and a moving average filter 88.

Similarly to the elements 31 to 34 of the optimum value search controller 30 according to the above-described embodiment, the four elements 81 to 84 of the optimum value search controller 80 calculate the reference input Ref, the inverted value Vinv, the filtered value Yf, and the product Z by the following equations (29) to (32):

$$Ref(k) = r \cdot \sin\left(\frac{2\pi}{Tref} \cdot (n-1) \cdot \Delta T\right) \tag{29}$$

$$Vinv(k) = -Vex(k) \tag{30}$$

$$Yf(k) = 0.5 \cdot Vinv(k) - 0.5 \cdot Vinv(k-1) \tag{31}$$

$$Z(k) = Yf(k) \cdot Ref(k-d) \tag{32}$$

Further, the integrator 85 calculates an integral value Cr' by the following equation (33):

$$Cr'(k) = \sum_{i=0}^{k} Z(i) \tag{33}$$

Furthermore, the amplifier 86 calculates a control input value Uc' by the following equation (34). It should be noted in the equation (34) Kex represents a predetermined gain.

$$Uc'(k) = Kex \cdot Cr'(k) \tag{34}$$

Next, the adder 87 calculates the FB injection amount Gurea_fb by the following equation (35):

$$Gurea\_fb(k) = Uc'(k) + Ref(k) \tag{35}$$

Furthermore, the moving average filter 88 performs a moving average filtering process on the FB injection amount Gurea_fb to thereby calculate the correction component Gurea_comp, as shown in the following equation (36):

$$Gurea\_comp(k) = \frac{1}{Nref} \sum_{i=0}^{Nref-1} (Gurea\_fb(k-i)) \tag{36}$$

Also when the optimum value search controller 80 configured as above is used, similarly to the case where the optimum value search controller 30 is used, it is possible to obtain the above-described advantageous effects. Particularly, since the correction component Gurea_comp is calculated as a value obtained by performing the moving average filtering process on the FB injection amount Gurea_fb, it is possible to prevent the frequency component of the reference input Ref from being mixed with the model modification coefficient Kff. This makes it possible to prevent the frequency component of the reference input Ref from circulating in a closed loop of a system to which is input the FF injection amount Gurea_ff, and from which is output the detection signal value Vex. This makes it possible to avoid generation of resonance caused by the circulation of the frequency component of the reference input Ref.

It should be noted that the moving average filtering process may be performed on the control input value Uc' to thereby calculate the correcting component Gurea_comp, as shown in the following equation (37) which is used in place of the above equation (36).

$$Gurea\_comp(k) = \frac{1}{Nref} \sum_{i=0}^{Nref-1} (Uc'(k-i)) \tag{37}$$

Also when the correcting component Gurea_comp is calculated by the above equation (37), for the same reason as described, the frequency component of the reference input Ref can be prevented from circulating in the closed loop of the system to which is input the FF injection amount Gurea_ff, and from which is output the detection signal value Vex, thereby making it possible to avoid generation of resonance caused by the circulation of the frequency component of the reference input Ref.

It should be noted that in this example, the optimum value search controller 80 corresponds to the supply amount-determining means, the reference input-calculating section 81 to the variation value-calculating means, the integrator 85 to the correlation parameter-calculating means, the amplifier 86 to the control input value-calculating means, and the integral value Cr' to the correlation parameter.

Further, the optimum value search controller 30 according to the above-described embodiment may be replaced by an ESC controller (FIG. 12), which has already been proposed by the present assignee in Japanese Laid-Open Patent Publication (Kokai) No. 2006-105031, for calculating the FB injection amount Gurea_fb and the correction component Gurea_comp with an algorithm for the ESC controller. In this case as well, similarly to the optimum value search controller 80, it is possible to prevent the frequency component of the reference input Ref from circulating in the closed loop, thereby making it possible to avoid generation of resonance caused by the circulation of the frequency component of the reference input Ref.

Further, although in the above-described embodiment, the number of the nonlinear weight functions $W_i$ is set to 3, by way of example, this is not limitative, but the number thereof may be set to 1, 2 or an integer not smaller than 4. Particularly when the NOx purification ratio of the urea selective reduction catalyst 7 uniformly changes with respect to the NOx emission amount Gnox_eng_hat, the number of the nonlinear weight functions $W_i$ can be set to 1. In this case, it is possible to reduce the load on the EPU 2.

Furthermore, although in the above-described embodiment, the reference input Ref which changes sinusoidally is used as the variation value, by way of example, the variation value according to the present invention is not limited to this, but any suitable variation value may be used insofar as it has an amplitude that changes periodically at a predetermined repetition period. For example, a value that changes in the form of a periodic function, such as a value that changes cosinusoidally or a value that changes in a triangular wave form, may be used.

On the other hand, although in the above-described embodiment, urea is used as the reducing agent, by way of example, the reducing agent according to the present invention is not limited to this, but any suitable reducing agent may be used insofar as it accelerates the reducing action of NOx in a selective reduction catalyst. For example, ammonia, deuterium ($H_2$), or ethanol may be used as a reducing agent. In this case, in place of the urea selective reduction catalyst 7 according to the above-described embodiment, a selective reduction catalyst may be used which is capable of reducing NOx effectively according to the kind of a used reducing agent. Also when such reducing agent and selective reduction catalyst are used, it is possible to obtain the aforementioned advantageous effects, similarly to the case of the above-described embodiment which uses urea and the urea selective reduction catalyst 7.

Further, although in the above-described embodiment, the FIG. 10 map is used as the correlation model, by way of example, the correlation model according to the present invention is not limited to this, but any correlation model may be used insofar as it defines the relationship between the NOx purification ratio parameter and the NOx purification ratio of the selective reduction catalyst at a predetermined degree of degradation. For example, a mathematical expression may be used as a correlation model. Furthermore, although in the above-described embodiment, a correlation model which uses the NOx purification ratio of the selective reduction catalyst that is in a new and not degraded condition, i.e. whose degree of degradation is equal to 0, is employed by way of example, this is not limitative, but a correlation model may be employed which defines the relationship between the NOx purification ratio parameter and the NOx purification ratio of the selective reduction catalyst that is actually degraded to a predetermined degree.

Further, although in the above-described embodiment, the NOx emission amount Gnox_eng_hat and the catalyst temperature Tscr are used as NOx purification ratio parameters, by way of example, the NOx purification ratio parameters of the present invention are not limited to these, but any suitable NOx purification ratio parameters may be used insofar as they have correlation between the same and the NOx purification ratio of the selective reduction catalyst.

Furthermore, although in the above-described embodiment, the positive model modification coefficient Kff is used as the model modification value, by way of example, a negative model modification coefficient may be used in place of the positive model modification coefficient Kff. For example, a value obtained by inverting the sign of the model modification coefficient Kff may be used as the model modification value. In this case, it is only required that it is determined in the step 10 whether or not the absolute value of the model modification coefficient Kff is not larger than the predetermined reference value Kref, and the estimated NOx purification ratio Ita_scr_hat is calculated by an equation in which Kff(k−1) on the right side of the equation (15) is replaced by [−Kff(k−1)].

It is further understood by those skilled in the art that the foregoing are preferred embodiments of the invention, and that various changes and modifications may be made without departing from the spirit and scope thereof.

What is claimed is:

1. An exhaust emission control device for an internal combustion engine, comprising:
    a selective reduction catalyst disposed in an exhaust passage of the engine, for purifying NOx in exhaust gases flowing through the exhaust passage, in the presence of a reducing agent;
    a reducing agent supply device for supplying the reducing agent to said selective reduction catalyst;
    exhaust gas concentration-detecting means disposed in the exhaust passage at a location downstream of said selective reduction catalyst, for outputting a detection signal indicative of a concentration of NOx and a concentration of the reducing agent in the exhaust gases, said exhaust gas concentration-detecting means having a characteristic that a direction of a change in a value of the detection signal responsive to an increase/decrease of the concentration of NOx is the same as a direction of a change in the value of the detection signal responsive to an increase/decrease of the concentration of the reducing agent;
    variation value-calculating means for calculating a variation value an amplitude of which changes periodically at a predetermined repetition period;
    correlation parameter-calculating means for calculating a correlation parameter indicative of a correlation between the value of the detection signal and the variation value by using the value of the detection signal and the variation value;
    control input value-calculating means for calculating a value of a control input for controlling the value of the detection signal to an extremal value, based on the correlation parameter; and
    supply amount-determining means for determining an amount of supply of the reducing agent to said selective reduction catalyst by said reducing agent supply device such that the supply amount of the reducing agent includes the value of the control input and the variation value.

2. An exhaust emission control device as claimed in claim 1, wherein the correlation parameter is calculated based on an integral value of a product of a value indicative of the value of the detection signal and the variation value, and
wherein said control input value-calculating means calculates the value of the control input with a predetermined feedback control algorithm such that the correlation parameter converges to 0.

3. An exhaust emission control device as claimed in claim 2, wherein the integral value is calculated by integrating the product over a section of an integral multiple of the predetermined repetition period.

4. An exhaust emission control device as claimed in claim 2, wherein the predetermined feedback control algorithm is an algorithm to which is applied a predetermined response-specifying control algorithm.

5. An exhaust emission control device as claimed in claim 1, wherein said exhaust gas concentration-detecting means comprises:
NOx concentration-detecting means for outputting a signal indicative of the concentration of NOx in the exhaust gases;
reducing agent concentration-detecting means for outputting a signal indicative of the concentration of the reducing agent in the exhaust gases; and
detection signal value-calculating means for calculating the value of the detection signal by using a combination of a value of the detection signal indicative of the concentration of NOx and a value of the detection signal indicative of the concentration of the reducing agent.

6. An exhaust emission control device for an internal combustion engine, comprising:
a selective reduction catalyst disposed in an exhaust passage of the engine, for purifying NOx in exhaust gases flowing through the exhaust passage, in the presence of a reducing agent;
exhaust gas concentration-detecting means disposed in the exhaust passage at a location downstream of said selective reduction catalyst, for outputting a detection signal indicative of concentrations of predetermined components including NOx in exhaust gases;
a reducing agent supply device for supplying the reducing agent to said selective reduction catalyst;
NOx purification ratio parameter-calculating means for calculating a NOx purification ratio parameter having a correlation with a NOx purification ratio of said selective reduction catalyst;
NOx purification ratio-calculating means for calculating the NOx purification ratio, based on the NOx purification ratio parameter, by using a correlation model defining a correlation between the NOx purification ratio parameter and the NOx purification ratio of said selective reduction catalyst degraded to a predetermined degree of degradation;
supply amount-determining means for determining an amount of supply of the reducing agent to said selective reduction catalyst by said reducing agent supply device, according to the NOx purification ratio; and
supply amount-correcting means for calculating a supply amount correction value according to a value of the detection signal from said exhaust gas concentration-detecting means, and correcting the amount of supply of the reducing agent to said selective reduction catalyst, by using the supply amount correction value,
wherein said NOx purification ratio-calculating means comprises:
model modification value-calculating means for calculating a model modification value with a predetermined algorithm such that an absolute value of the supply amount correction value is reduced; and
purification ratio-calculating means for calculating the NOx purification ratio by using the correlation model modified by the model modification value.

7. An exhaust emission control device as claimed in claim 6, wherein said model modification value-calculating means calculates a plurality of products by multiplying a plurality of modification coefficients by values of a plurality of predetermined functions, respectively, and calculating the model modification value by using a total sum of the plurality of products,
wherein the plurality of predetermined functions are associated with a plurality of regions formed by dividing a region where the NOx purification ratio parameter is variable, respectively, and are set to values other than 0 in the associated regions while being set to 0 in regions other than the associated regions, and two adjacent ones of the regions overlap each other and are configured such that an absolute value of a total sum of values of the functions associated with the overlapping regions is equal to an absolute value of a maximum value of each function, and
wherein each of the plurality of modification coefficients is calculated such that the absolute value of the supply amount correction value decreases in one of the regions associated with one of the functions by which the each modification coefficient is multiplied.

8. An exhaust emission control device as claimed in claim 6, wherein said exhaust gas concentration-detecting means outputs a detection signal indicative of a concentration of NOx and a concentration of the reducing agent in exhaust gases, as the detection signal indicative of the concentrations of the components, and has a characteristic that a direction of a change in a value of the detection signal responsive to an increase/decrease of the NOx concentration is the same as a direction of a change in the value of the detection signal responsive to an increase/decrease of the concentration of the reducing agent;
wherein said supply amount-correcting means comprises:
variation value-calculating means for calculating a variation value an amplitude of which changes periodically at a predetermined repetition period;
correlation parameter-calculating means for calculating a correlation parameter indicative of a correlation between the value of the detection signal and the variation value by using the value of the detection signal and the variation value; and
control input value-calculating means for calculating the supply amount correction value as a control input value for controlling the value of the detection signal to an extremal value, based on the correlation parameter,
wherein the amount of supply of the reducing agent to said selective reduction catalyst is corrected by a sum of the value of the control input and the variation value.

9. An exhaust emission control device as claimed in claim 8, wherein said correlation parameter-calculating means calculates the correlation parameter by integrating a product of a value indicative of the value of the detection signal and the variation value, over a section of an integral multiple of the predetermined repetition period.

10. An exhaust emission control device as claimed in claim 8, wherein said model modification value-calculating means calculates the model modification value by using a value obtained by integrating one of the sum of the value of the control input and the variation value, and the value of the control input, over a section of an integral multiple of the predetermined repetition period.

11. An exhaust emission control device as claimed in claim 6, further comprising:
   degradation-determining means for determining that said selective reduction catalyst has been degraded when an absolute value of the model modification value has exceeded a predetermined value; and
   warning means for outputting warning information indicative of the degradation of said selective reduction catalyst when it is determined by said degradation-determining means that said selective reduction catalyst has been degraded.

12. An exhaust emission control device as claimed in claim 6, further comprising:
   degradation-determining means for determining that said selective reduction catalyst has been degraded when an absolute value of the model modification value has exceeded a predetermined value; and
   inhibiting means for inhibiting supply of the reducing agent to said selective reduction catalyst by said reducing agent supply device when it is determined by said degradation-determining means that said selective reduction catalyst has been degraded.

* * * * *